United States Patent
Nagaura et al.

(10) Patent No.: US 6,591,380 B1
(45) Date of Patent: Jul. 8, 2003

(54) MEANS FOR COMPARING SENT DATA ON THE TRANSMISSION SIDE OF A NETWORK IN A HIGHLY RELIABLE DISTRIBUTED SYSTEM

(75) Inventors: Wataru Nagaura, Hitachi (JP); Takanori Yokoyama, Hitachi (JP); Shoji Suzuki, Hitachi (JP); Satoru Kuragaki, Hitachi (JP); Takaaki Imai, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/455,474

(22) Filed: Dec. 6, 1999

(30) Foreign Application Priority Data

Dec. 4, 1998 (JP) .......................... 10-345126

(51) Int. Cl.7 ............................................... G06F 11/00
(52) U.S. Cl. .......................................... 714/49; 714/48
(58) Field of Search ........................................ 714/1–57

(56) References Cited

U.S. PATENT DOCUMENTS

| | | | |
|---|---|---|---|
| 4,340,933 A | * 7/1982 | Miu et al. | 714/53 |
| 4,412,281 A | * 10/1983 | Works | 714/4 |
| 5,153,881 A | * 10/1992 | Bruckert et al. | 714/10 |
| 5,428,745 A | * 6/1995 | de Bruijn et al. | 713/155 |
| 5,444,643 A | 8/1995 | Haeussler et al. | 364/579 |
| 5,675,579 A | * 10/1997 | Watson et al. | 370/241 |
| 5,675,807 A | * 10/1997 | Iswandhi et al. | 710/260 |
| 5,687,314 A | * 11/1997 | Osman et al. | 709/250 |
| 5,751,955 A | * 5/1998 | Sonnier et al. | 709/400 |
| 5,790,776 A | * 8/1998 | Sonnier et al. | 710/18 |
| 5,809,543 A | * 9/1998 | Byers et al. | 711/120 |
| 6,148,349 A | * 11/2000 | Chow et al. | 709/214 |
| 6,151,689 A | * 11/2000 | Garcia et al. | 714/18 |
| 6,157,967 A | * 12/2000 | Horst et al. | 370/236 |
| 6,185,577 B1 | * 2/2001 | Nainani et al. | 707/201 |
| 6,233,702 B1 | * 5/2001 | Horst et al. | 714/11 |

FOREIGN PATENT DOCUMENTS

| | | |
|---|---|---|
| EP | 0 432 924 A2 | 11/1990 |
| WO | 84/03192 | 8/1984 |

* cited by examiner

*Primary Examiner*—Nadeem Iqbal
*Assistant Examiner*—Tim M Bonura
(74) *Attorney, Agent, or Firm*—Crowell & Moring LLP

(57) ABSTRACT

The highly reliable distributed system is composed of a communication protocol processing unit which comprises a mailbox for storing a communication message, and executes communication protocol processing between data of an application program and a network controller using the network controller performing network communication of the message in the mailbox; an error detection coding unit; an error detection decoding unit which reconverts data converted from communication data by the error detection coding unit to the original data, and detects that the content of the data is damaged if it is damaged; and a data comparing unit for checking whether or not two kinds of data agree with each other.

17 Claims, 23 Drawing Sheets

FIG.13

MESSAGE ATTRIBUTE TABLE 2021

| MAILBOX NO. | MessageID | DataSize | QUEUED | LOCKED | NOMSG | LIMIT | CHECK |
|---|---|---|---|---|---|---|---|
| 0 | 100 | 8 | 0 | 1 | 1 | 0 | YES |
| 1 | 200 | 8 | 1 | 0 | 1 | 0 | NO |
| 2 | 500 | 8 | 0 | 0 | 1 | 0 | YES |
| . | . | . | . | . | . | . | . |
| . | . | . | . | . | . | . | . |

4001

2051

TASK PRIORITY MANAGEMENT TABLE

| TASK ID | TASK PRIORITY |
|---------|---------------|
| TASK A  | 1             |
| TASK B  | 2             |
| TASK C  | 3             |

MEANS FOR COMPARING SENT DATA ON THE TRANSMISSION SIDE OF A NETWORK IN A HIGHLY RELIABLE DISTRIBUTED SYSTEM

BACKGROUND OF THE INVENTION

The present invention relates to a distributed system connected to a network, and particularly to a highly reliable distributed system suitable for ensuring that message data is not damaged during send and receive processing of a message.

When a message is sent and received through a network, a network controller for implementing network communication by hardware and communication software for performing the network communication using the network controller are used. When data stored in an application program is sent, the data is written to the network controller through send protocol processing. When data is received, a message arrived at the network controller is written in the application program through receive protocol processing. As described above, the send and receive protocol processing between the application program and the network controller at sending and receiving data is processed using the communication software. When a bug exists in the communication software, when a register or a memory used by the communication software are damaged even if temporary, or when the content of data is changed by some reason, the content of data damaged by the send and receive protocol is sent or received. In order to ensure that the content of data is not damaged by the send and receive protocol, there is a method of using a plurality of versions of communication software implementing the same send and receive protocol processing created by a plurality of different persons. This method ensures that the content of data is not damaged by checking whether or not a result manipulated with send and receive protocol processing by one version of communication software agrees with a result manipulated with send and receive protocol processing by another version of communication software.

The above-mentioned prior art has a problem in that a plurality of versions of communication software need to be created.

SUMMARY OF THE INVENTION

An object of the present invention is to provide a means capable of ensuring by manipulating send and receive communication processing using one version of communication software that the content of data is not damaged.

In order to attain the above object, the present invention provides the following systems.

That is, the present invention provides the first highly reliable distributed system including a memory for storing an application program, a CPU for executing the application program stored in the memory, and a network controller for sending a sent message onto a network and receiving a received message transmitted on the network, the network controller being connected to the network, the network controller sending the sent message or receiving the received message while the CPU is executing the application program stored in the memory, the highly reliable distributed system comprises: a sent data memory means for storing sent data generated by the application program; a received message memory means for storing a received message transmitted on the network; a send protocol processing means for receiving sent data stored in the sent data memory means and executing predetermined send protocol processing to compose a sent message to be transferred to the network controller, using the sent data; a receive protocol processing means for receiving a sent message generated by the send protocol processing means, and executing predetermined receive protocol processing to extract a data part from the composed sent message; and a sent data comparing means for comparing the sent data stored in the sent data memory means with the data part extracted from the composed sent message by the receive protocol processing means.

In the second highly reliable distributed system according to the first system, the network controller is requested to send the sent message composed by the send protocol processing means only when a result of the comparing executed by the sent data comparing means indicates agreement.

Also, in the third highly reliable distributed system according to the first system, the network controller is requested to send the sent message just after the sent message is composed by the send protocol processing means.

Next, the present invention provides the fourth highly reliable distributed system including a memory for storing an application program, a CPU for executing the application program stored in the memory, and a network controller for sending a sent message onto a network and receiving a received message transmitted on the network, the network controller being connected to the network, the network controller sending the sent message or receiving the received message while the CPU is executing the application program stored in the memory, the highly reliable distributed system comprises: a sent data memory means for storing sent data generated by the application program; a received message memory means for storing a received message transmitted on the network; a receive protocol processing means for receiving the received message stored in the received message memory means, and executing predetermined receive protocol processing to extract a data part, which is to be written in the application program, from the received sent message; a send protocol processing means for receiving the data part extracted from the received sent message by the receive protocol processing means, and executing predetermined send protocol processing to compose a received message, using the extracted data part; and a received message comparing means for comparing the received message stored in the received message memory means with the received message composed by the send protocol processing means.

In the fifth highly reliable distributed system according to the fourth system, the data part extracted from the received message stored in the received message memory means is written in the application program only when a result of the comparing executed by the received message comparing means indicates agreement.

Also, in the sixth highly reliable distributed system according to the fourth system, the data part extracted from the received message stored in the received message memory means is written in the application program just after the data part is extracted by the receive protocol processing means.

Moreover, in the seventh highly reliable distributed system according to the fourth system, the send protocol processing means executes predetermined send protocol processing to composes a sent message, using a sent data generated by the application program, which is to be transmitted onto the network, and the receive protocol processing means executes predetermined receive protocol processing means to extracted a data part from the sent message composed by the send protocol processing means, using the sent data which is generated by the application program, the distributed system further including sent data comparing means for comparing the sent data stored in the sent data memory means with the data part which is extracted by the receive protocol processing means from the sent message composed by the send protocol processing means.

Further, in the eighth highly reliable distributed system according to the seventh system, the network controller is requested to send the sent message composed by the send protocol processing means only when a result of the comparing executed by the sent data comparing means indicates agreement, and the data part extracted from the received message stored in the received message memory means is written in the application program only when a result of the comparing executed by the received message comparing means indicates agreement.

Furthermore, in the ninth highly reliable distributed system according to the system seventh, the network controller is requested to send the sent message just after the sent message is composed by the send protocol processing means, and the data part extracted from the received message stored in the received message memory means is written in the application program only when a result of the comparing executed by the received message comparing means indicates agreement.

In addition, in the tenth highly reliable distributed system according to the seventh system, the network controller is requested to send the sent message composed by the send protocol processing means only when a result of the comparing executed by the sent data comparing means indicates agreement, and the data part extracted from the received message stored in the received message memory means is written in the application program only when a result of the comparing executed by the received message comparing means indicates agreement.

Also, in the eleventh highly reliable distributed system according to the system seventh, wherein the network controller is requested to send the sent message just after the sent message is composed by the send protocol processing means, and the data part extracted from the received message stored in the received message memory means is written in the application program just after a result of the comparing executed by the received message comparing means indicates agreement.

Moreover, in the twelfth highly reliable distributed system according to any one of the first, second, seventh, and tenth systems, the send protocol processing means comprises: an error detection coding means for receiving the sent data stored in the sent data memory means, executing predetermined error detection coding processing, and generating error-detection-coded sent data; and an error-detection-coded data send protocol processing means for receiving the error-detection-coded sent data generated by the error detection coding means, executing predetermined send protocol processing, and composing a sent message to be transferred to the network controller, and the receive protocol processing means comprises: an error detection coding receive protocol means for receiving the sent message generated by the send protocol processing means, executing predetermined receive protocol processing, and extracting an error-detection-coded sent data part from the error-detection-coded sent message; and an error detection decoding processing means for receiving the error-detection-coded sent data part extracted by the error detection coding receive protocol processing means, executing predetermined error detection decoding processing to extract a sent data part from the error-detection-coded sent data part, and checking for that an error exists in the error-detection-coded send data part extracted from the error-detection-coded sent message.

Further, in the thirteenth highly reliable distributed system according to any one of the first, third, ninth, and tenth, the send protocol processing means comprises: an error detection coding means for receiving the sent data stored in the sent data memory means, executing predetermined error detection coding processing, and generating error-detection-coded sent data, using the sent data; and an error-detection-coded data send protocol processing means for receiving the error-detection-coded sent data generated by the error detection coding means, executing predetermined send protocol processing, composing a sent message to be transferred to the network controller, using the error-detection-coded sent data, and requesting the network controller to send the sent message, and the receive protocol processing means comprises: an error detection coding receive protocol means for receiving the sent message composed by the send protocol processing means, executing predetermined receive protocol processing, and extracting an error-detection-coded sent data part from the error-detection-coded sent message; and an error detection decoding processing means for receiving the error-detection-coded sent data part extracted by the error detection coding receive protocol processing means, executing predetermined error detection decoding processing, extracting a sent data part from the error-detection-coded sent data part, and checking for that an error exists in the error-detection-coded sent data part in the error-detection-coded sent message.

Further still, in the fourteenth highly reliable distributed system according to any one of the fifth, seventh, and ninth systems, the receive protocol processing means comprises: an error detection coding receive protocol processing means for receiving the received message stored in the received message memory means, executing predetermined receive protocol processing, and extracting an error-detection-coded received data part from the received message; and an error detection decoding processing means for receiving the error-detection-coded received data part extracted by the error detection coding receive protocol processing means, executing predetermined error detection coding processing, extracting a received data part from the error-detection-coded received data part, which is transferred to the application program, and checking for that an error exists in the error-detection-coded received data part, and the send protocol processing means comprises: an error detection coding means for receiving the received data part extracted by the receive protocol processing means, executing predetermined error detection coding processing, and generating error-detection-coded received data; and an error-detection-coded data send protocol processing means for receiving the error-detection-coded received data generated by the error detection coding means, executing predetermined send protocol processing, and composing a received message.

Furthermore, in the fifteenth highly reliable distributed system according to any one of the sixth, tenth, and eleventh systems, the receive protocol processing means comprises: an error detection coding receive protocol processing means for receiving the received message stored in the received message memory means, executing predetermined receive protocol processing, and extracting error-detection-coded received data part from the received message; and an error detection decoding processing means for receiving the error-detection-coded received data part extracted by the error detection coding receive protocol processing means, executing predetermined error detection coding processing, extracting a received data part to be transferred to the application program, checking for that an error exists in the error-detection-coded received data part, and transferring the received data part to the application program only when it is not detected that the error exists in the error-detection-coded received data part, and the send protocol processing means comprises: an error detection coding means for receiving the received data part extracted by the receive protocol processing means, executing predetermined error detection coding processing, and generating error-detection-coded received data; and an error-detection-coded data send protocol processing means for receiving the error-detection-coded received data generated by the error detection coding means, executing predetermined send protocol processing, and composing a received message.

On the top of that, in the sixth highly reliable distributed system according to any one of the first to fifteenth systems, the high reliability distributed system is a vehicle control system.

BRIEF DESCRIPTION OF THE DRAWINGS

FIG. 13 is a detailed view showing the construction of the message attribute table 2021 composing the CAN driver in the control unit of the embodiment of the highly reliable distributed system in accordance with the present invention.

DETAILED DESCRIPTION OF THE EMBODIMENT

Embodiment 1

Figure 1:
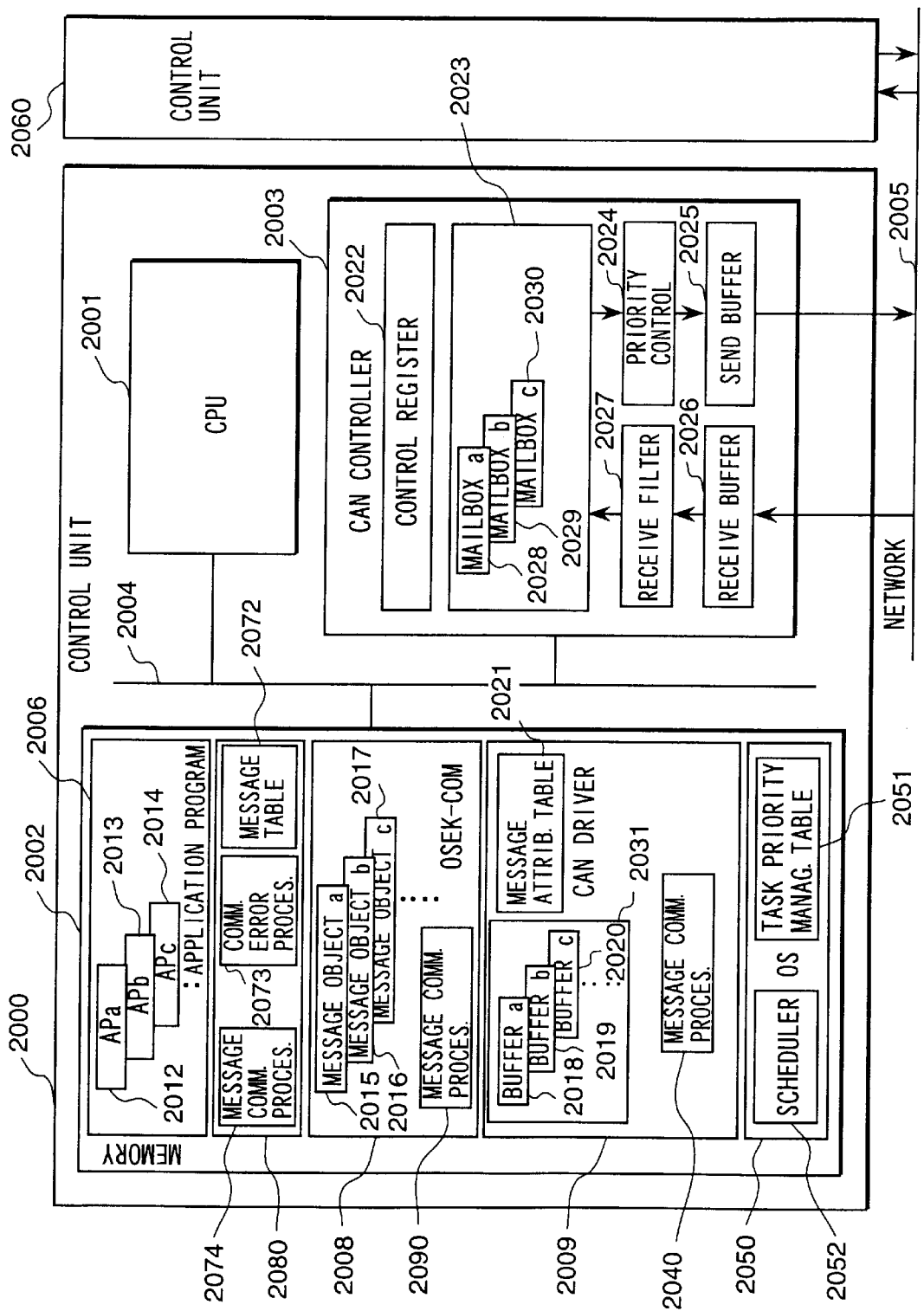
FIG. 1 is a block diagram showing the construction of an embodiment of a highly reliable distributed system in accordance with the present invention.

FIG. 1 is a block diagram showing the construction of an embodiment of a highly reliable distributed system in accordance with the present invention. In the high reliability distributed system, control units 2000 and 2060 are connected by a network 2005. The network of the present invention used is a CAN (controller area network) described in, for example, the Specification of DeviceNet (Volume 1, Release 2.0, 1998), section 2, 2.1–2.8, published by Open DeviceNet Vendor Association Company. The control unit 2000 is composed of a CPU 2002, a memory 2002 and a CAN controller 2003 which are connected by bus 2004. The control units are, for example, an engine control unit for controlling an engine, a motor control unit for controlling a motor, a reduction gear control unit for controlling a reduction gear, a throttle control unit for controlling a throttle and a brake control unit for controlling a brake which compose a hybrid electric vehicle control system. Each of the control units is connected with the CAN of the network 2005, and is operated by communicating with other control units. The CAN controller 2003 is connected to a CAN controller contained in another control unit 2060 through the network 2005. The memory 2002 stores an application program 2006, highly reliable communication software 2080, an OSEK-COM 2008, a CAN driver 2009 and an OS 2050. Therein, the CSEK-COM is a program for processing OSEK-COM protocol which is described in the Specification of OSEK/VDX Communication, Version 2.1, Revision 1, 1998, published by OSEK. The OSEK-COM 2008 corresponds to the send protocol processing and the receive protocol processing described in Means to solve the Problems. The CPU 2001 executes program processing by reading the program stored in the memory 2002. The OS 2050 has a multi-task function capable of executing a plurality of tasks in parallel. The CAN controller 2003 is hardware executing message sending and message receiving with the other control unit 2060. The CAN controller 2003 corresponds to the network described in Means to solve the Problems.

The highly reliable communication software 2080, the OSEK-COM 2008, the CAN driver 2009, the CAN controller 2003, the application program 2006 and the OS 2050 will be described below in detail in this order.

(b) Highly Reliable Communication Software

The highly reliable communication software 2080 will be described in detail. Initially, the software construction of the highly reliable communication software 2080 will be described. As shown in FIG. 1, the highly reliable communication software 2080 is composed of a message table 2072, communication error processing 2073 and message communication processing 2074.

Figure 27:
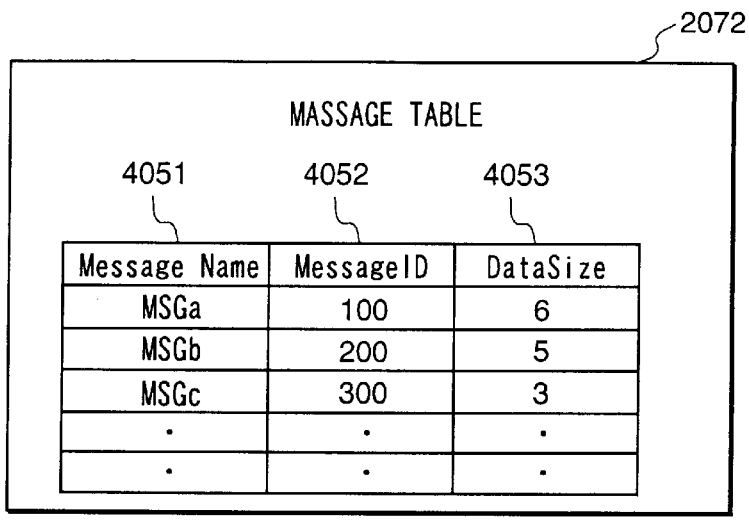
FIG. 27 is a detailed view showing the construction of the message table 2072 of the embodiment of the highly reliable software in accordance with the present invention.

The message table 2072 will be initially described in detail. FIG. 27 is a detailed view showing the construction of the message table 2072. The message table 2072 is composed of Message Name 4051, Message ID 4052 and Data Size 4053. The Message Name 4051 an area for storing data for uniquely determining one out of a plurality of message objects prepared in the OSEK-COM 2008, and is, for example, a pointer indicating a message object a 2015. The Message ID 4052 is an area for storing message IDs. The Data Size 4053 is an area for storing data sizes.

Figure 29:
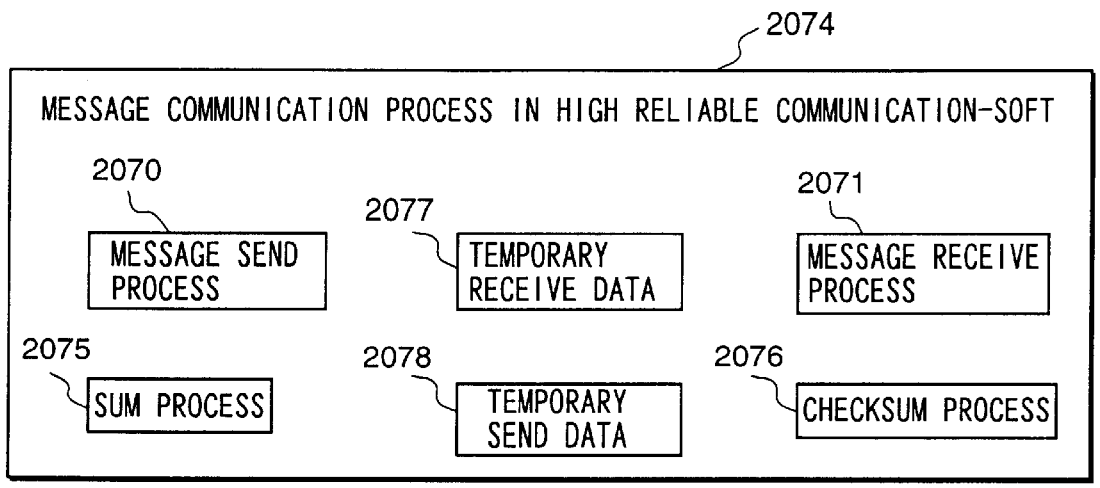
FIG. 29 is a detailed block diagram showing the construction of the message communication processing 2074 of the embodiment of the highly reliable software in accordance with the present invention.
Figure 30:
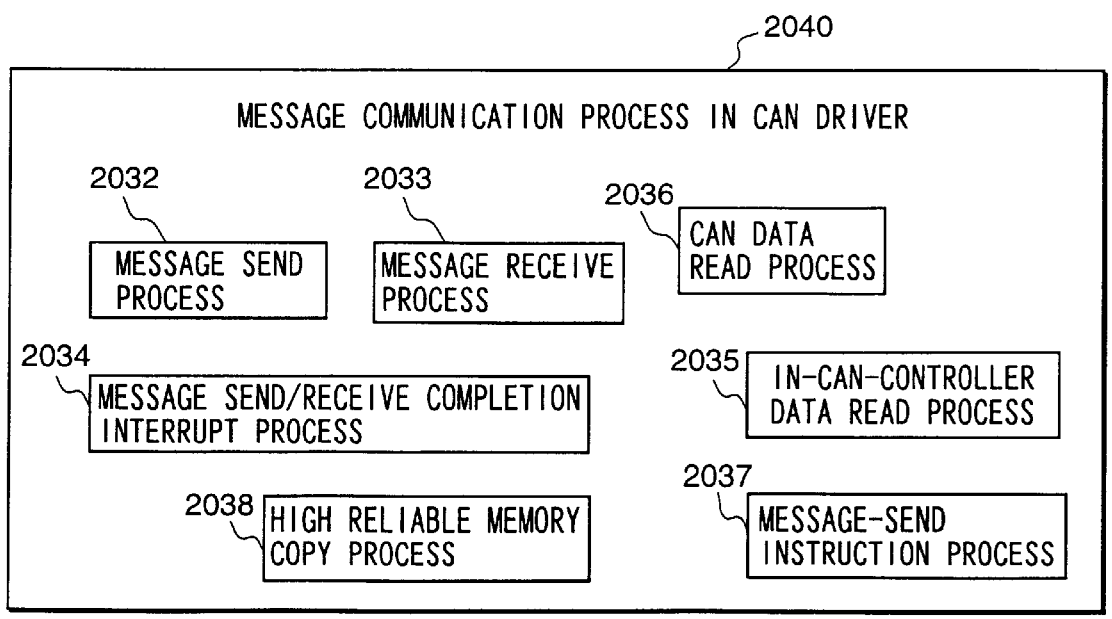
FIG. 30 is a detailed block diagram showing the construction of the message communication processing 2040 of the embodiment of the CAN driver in accordance with the present invention.

Next, the message communication processing 2074 will be described in detail. FIG. 29 is a detailed block diagram showing the construction of the message communication processing 2074. The message communication processing 2074 is composed of message send processing 2070, message receive processing 2071, sum processing 2075, checksum processing 2076, temporary receive data 2077 and temporary send data 2078. The message send processing 2070 corresponds to the error detection coding data send protocol processing means described in Means to solve the Problems. The message receive processing 2071 corresponds to the error detection coding receive protocol processing means described in Means to solve the Problems. The sum processing 2075 corresponds to the error detection coding means described in Means to solve the Problems. The checksum processing 2076 corresponds to the error detection decoding processing means described in Means to solve the Problems. The sum processing 2075 and the checksum processing 2076 will be described liter in detail.

The temporary receive data 2077 and the temporary send data 2078 will be firstly described. The temporary receive data 2077 corresponds to the area for storing the error detection coding sent data described in Means to solve the Problems. The temporary send data 2078 corresponds to the area for storing the error detection coding received data described in Means to solve the Problems. The temporary receive data 2077 and the temporary send data 2078 are areas for storing message data, and the areas (2077, 2078) are reserved when the message communication processing 2074 is called, and the reserved areas (2077, 2078) are eliminated when the message communication processing is completed.

Figure 22:
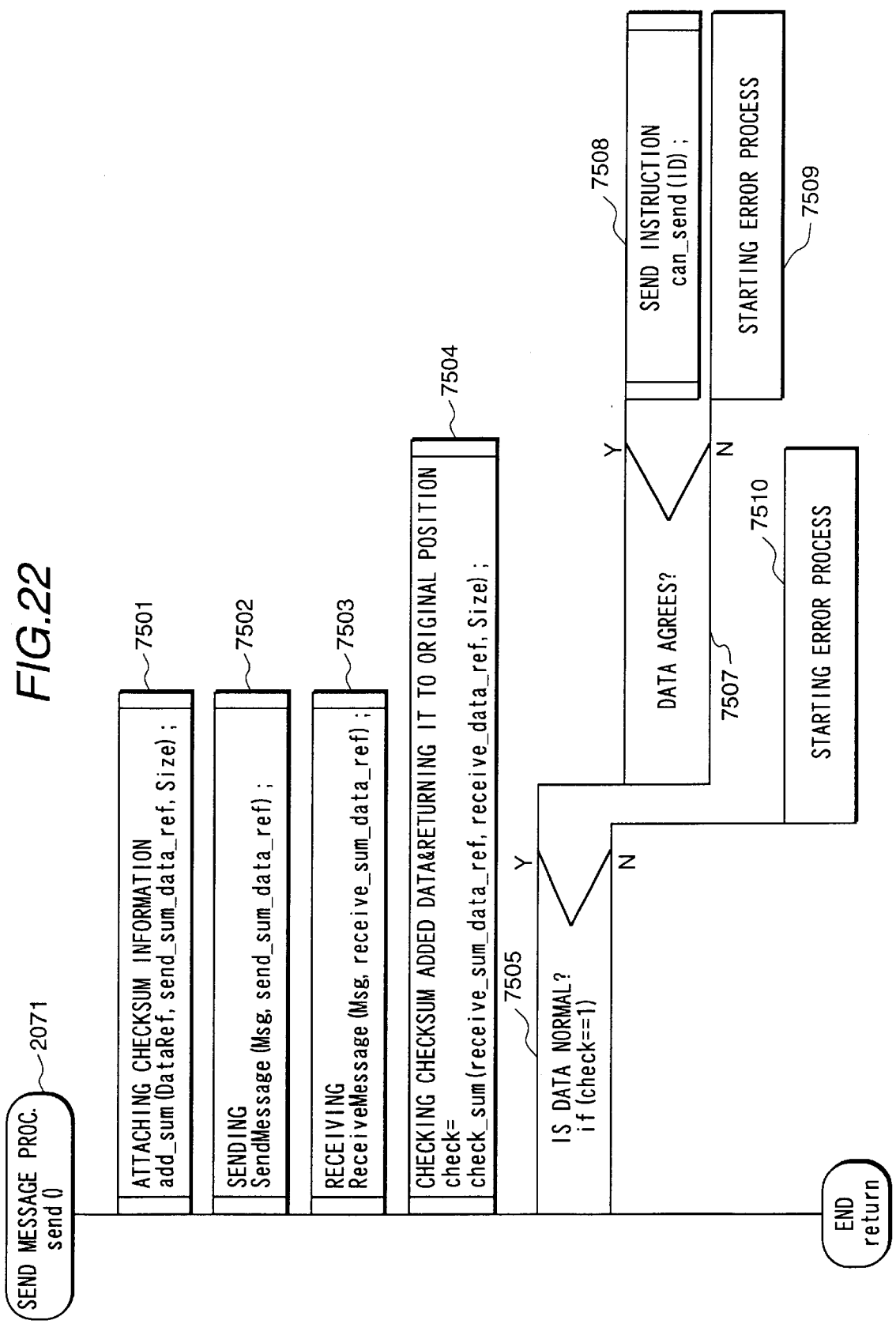
FIG. 22 is a flow chart showing the flow of the message send processing 2070 of the embodiment of the highly reliable software in accordance with the present invention.

Next, the message send processing 2070 will be described. FIG. 22 is a flow chart showing the flow of the message send processing 2070. The message send processing will be described, referring to FIG. 22.

In Step 7501, sum processing of data to be sent is executed using the sum processing 2075, and the result of the generated data is written in the temporary send data 2078. The data generated in Step 7051 corresponds to the error detection coding sent data and the error detection coding sending described in Means to solve the Problems. An address storing the sent data is passed as an argument when the message send processing 2070 is called. The sum processing 2075 will be described later. The area storing data to be executed with sum processing in Step 7501 corresponds to the send data memory means described in Means to solve the Problems.

Figure 5:
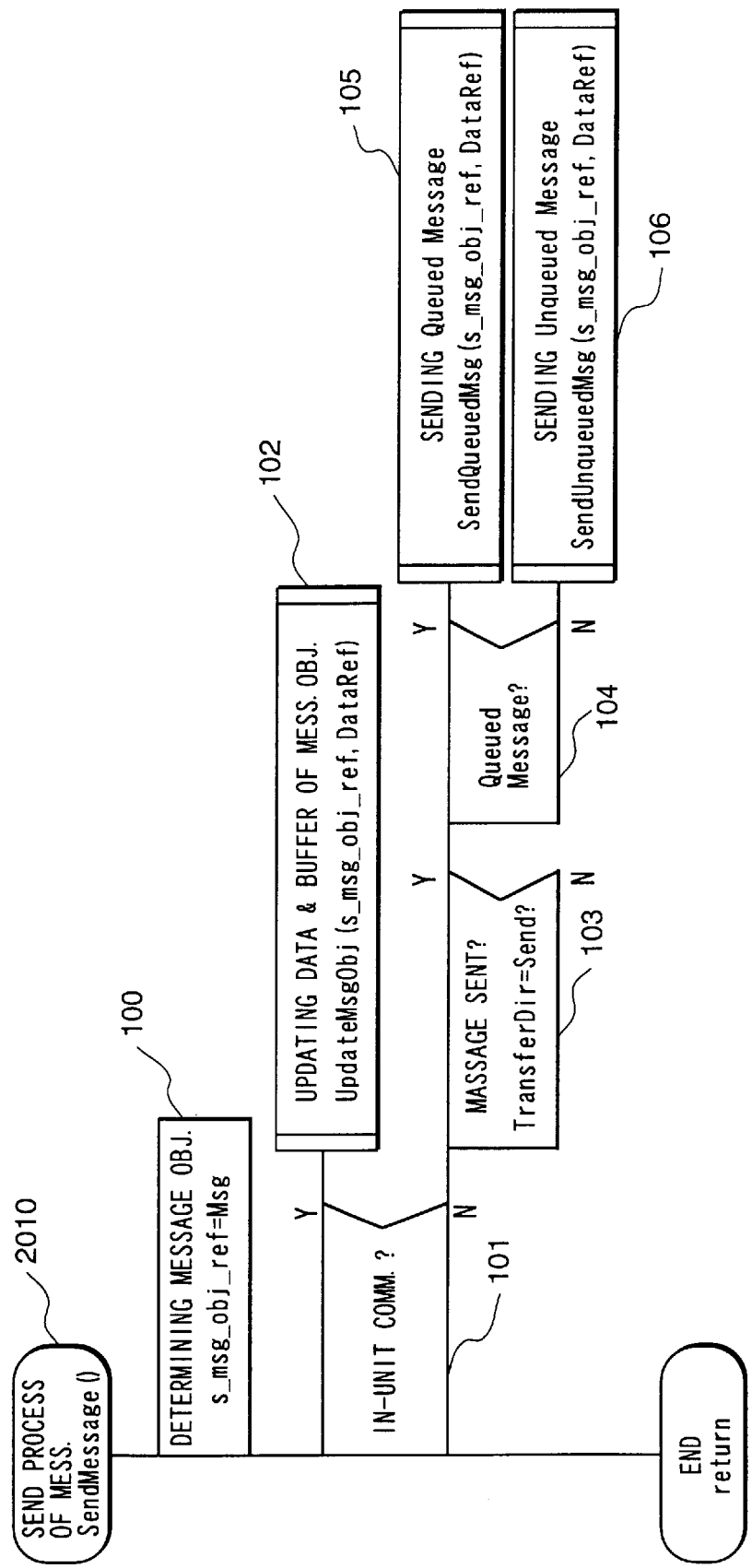
FIG. 5 is a flow chart showing the flow of the message send processing 2010 of the embodiment of the OSEK-COM in accordance with the present invention.

In Step 7502, sending processing of the data of the temporary send data 2078 is executed using message sending processing 2010 shown in FIG. 5, of the message communication processing 2090 of the OSEK-COM 2008.

Figure 11:
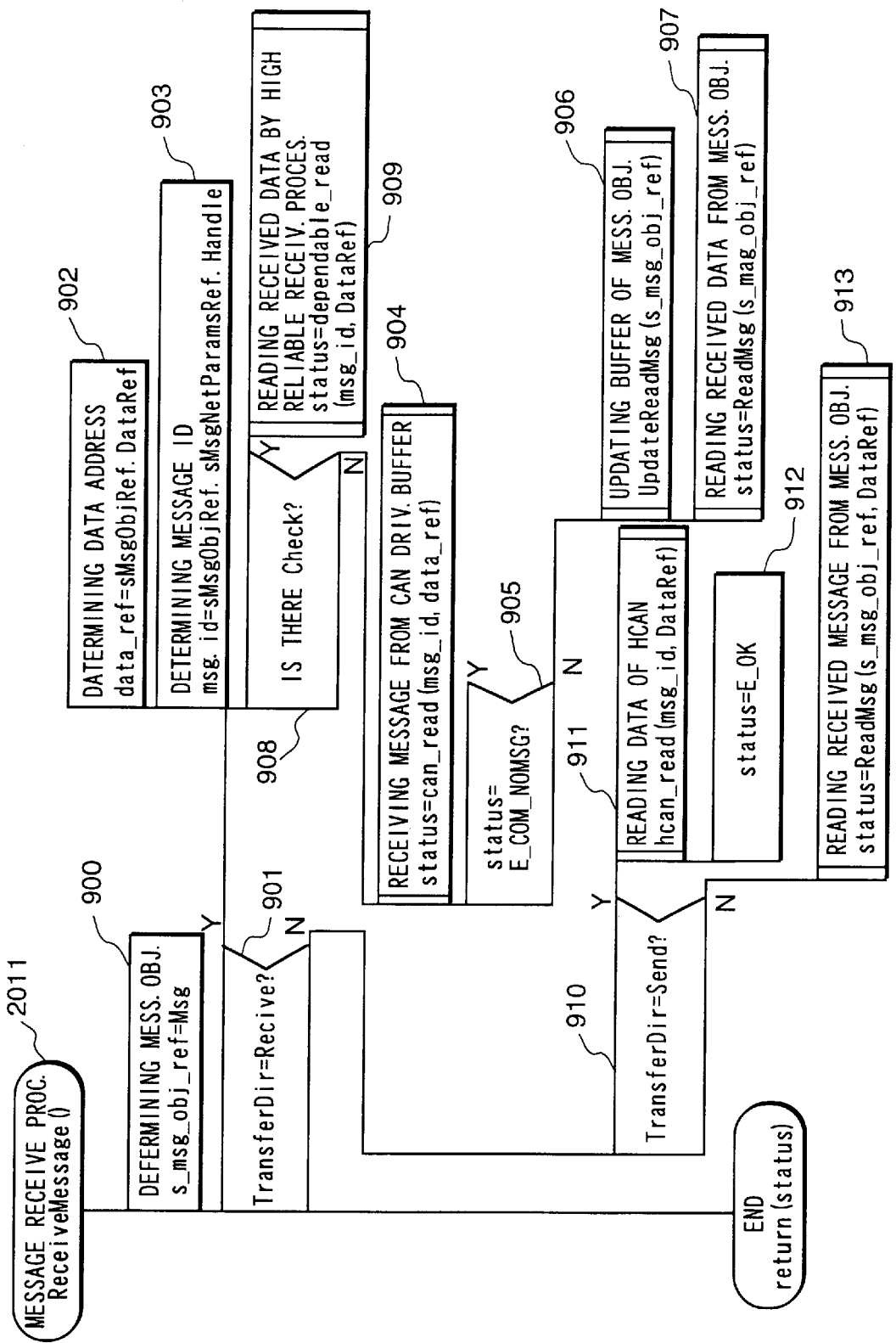
FIG. 11 is a flow chart showing the flow of the message receive processing 2011 of the embodiment of the OSEK-COM in accordance with the present invention.

In Step 7503, the data send processed using message receive processing 2011 shown in FIG. 11, of the message [co]mmunication processing 2090 of the OSEK-COM 2008 is written to the temporary receive data 2077.

In Step 7504, checksum processing of the data of the temporary receive data 2077 is executed using the checksum processing 2076, and the result of the generated data is written to the temporary receive data 2077. The checksum 2076 will be described later. The data generated in Step 7504 corresponds to the sent message receive equivalently converted data described in Means to solve the Problems.

In Step 7505, it is judged whether or not the result checksum-processed in Step 7504 is normal.

If normal, in Step 7507, comparison is made to check whether or not the sent data in the application program 2006 agrees with the temporary receive data 2077. An address storing the sent data is passed as an argument when the message send processing 2070 is called.

If agrees, in Step 7508, the data is sent using message-send instruction processing 2037 of the message communication processing 2040 of the CAN driver 2009.

If not agrees, in Step 7509, communication error processing 2073 is started.

If not normal in Step 7505, communication error processing 2073 is started in Step 7510.

The series of processing in Step 7505, in Step 7507, in Step 7508 and in Step 7509 corresponds to the send data comparing means described in Means to solve the Problems.

Figure 23:
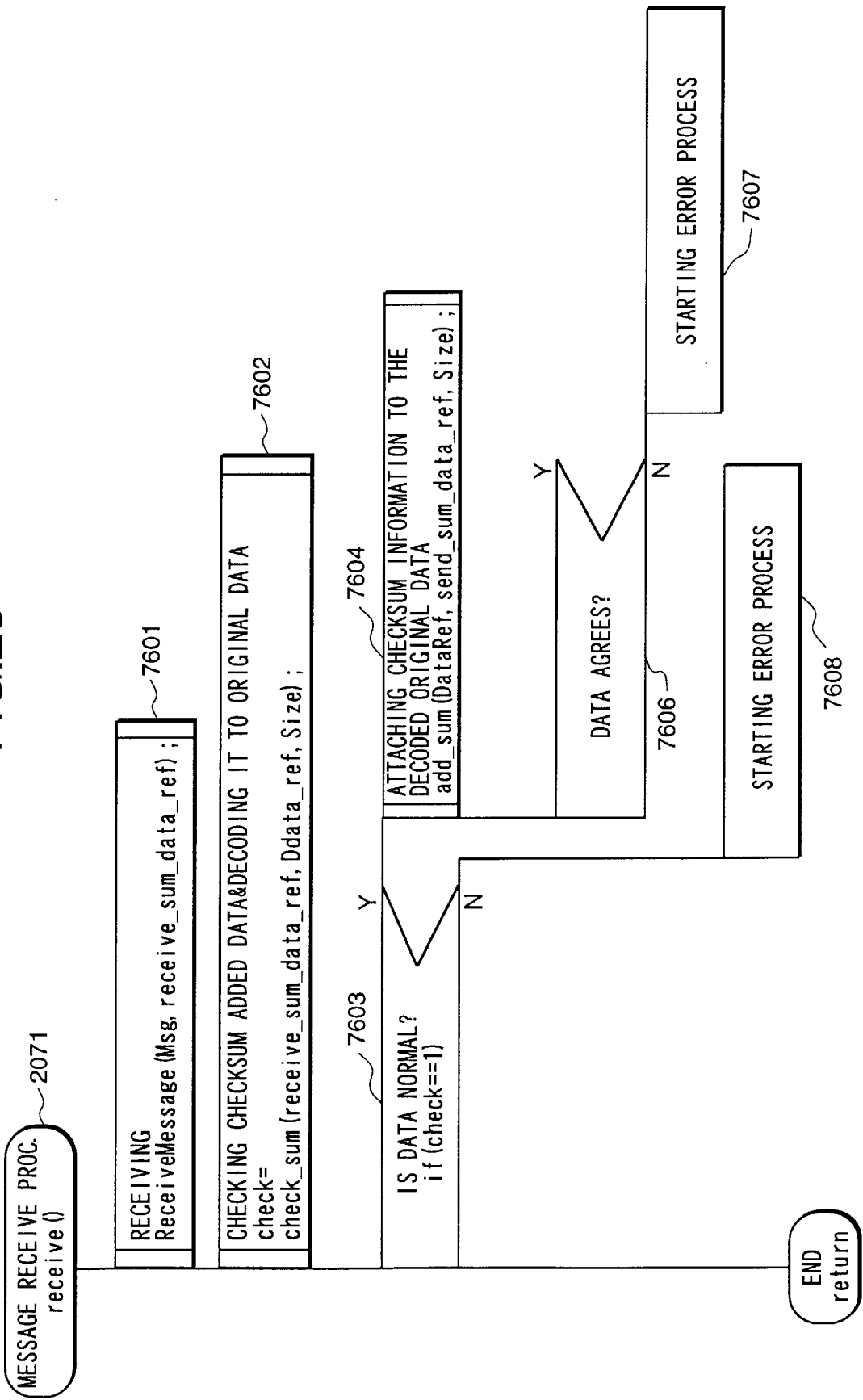
FIG. 23 is a flow chart showing the flow of the message receive processing 2071 of the embodiment of the highly reliable software in accordance with the present invention.

The message receive processing 2071 will be described below in detail. FIG. 23 is a flow chart showing the flow of the message receive processing 2071. The message receive processing will be described, referring to FIG. 23.

In Step 7601, the data receive processed using message receive processing 2011 of the message communication processing of the OSEK-COM 2003 is written to the temporary receive data 2077.

In Step 7602, checksum processing of the data of the temporary receive data 2077 is executed using the checksum processing 2076, and the result of generated data is written to the write target address in the application program 2006. The write target address is passed as an argument when the message receive processing 2071 is called.

In Step 7603, it is judged whether or not the result checksum-processed in Step 7602 is normal.

If normal, sum processing of the data in the application program 2006 written in Step 7602 is executed, and the result of the generated data is written in the temporary send data 2078. The data generated in Step 7604 corresponds to the error detection coding sent message receive data described in Means to solve the Problems.

In Step 7606, comparison is made on whether or not the temporary receive data 2077 agrees with the temporary send data 2078.

If does not agree, the communication error processing 2077 is started in Step 7607.

If not normal in Step 7603, the communication error processing 2077 is started in Step 7608.

The series of processing in Step 7603, in Step 7604, in Step 7606 and in Step 7607 corresponds to the received massage comparing means described in Means to solve the Problems.

Figure 25:
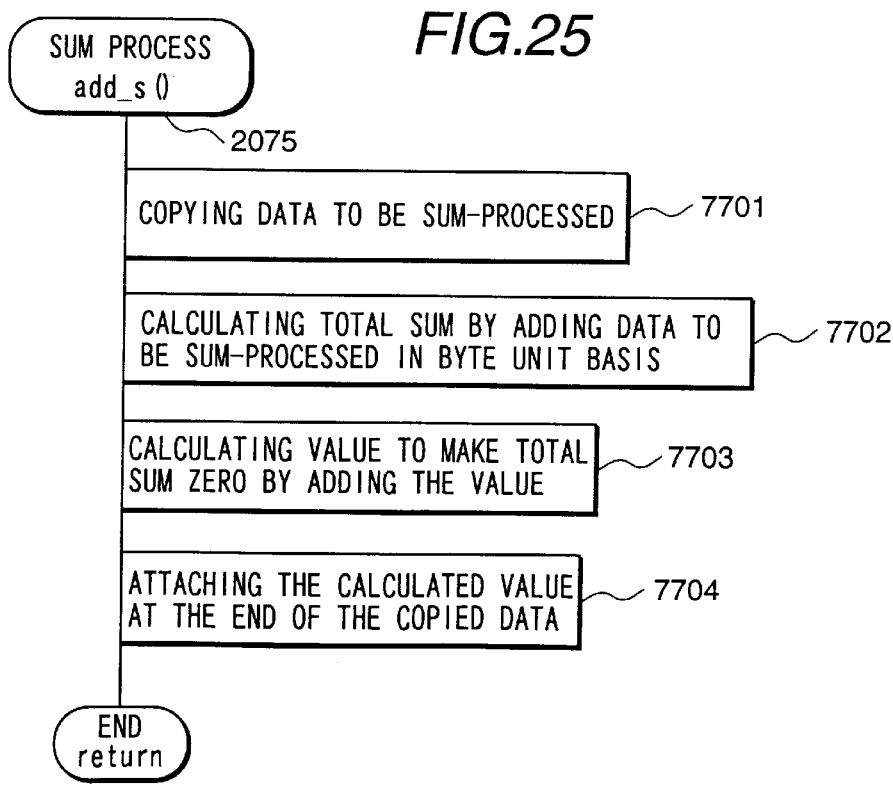
FIG. 25 is a flow chart showing the flow of the sum processing 2075 of the embodiment of the highly reliable software in accordance with the present invention.

The sum processing 2075 will be described below in detail. The sum processing corresponds to the predetermined error detection coding processing described in Means to solve the Problems. The sum processing is processing of separating data by a byte length, adding all the separated data in the byte unit, and adding data having a byte length which makes the total sum zero. The carry at addition is neglected. FIG. 25 is a flow chart showing the flow of the sum processing 2075. The sum processing 2075 will be described, referring to FIG. 25.

In Step 7701, data to be sum-processed is copied to a write target address. The write target address is passed as an argument when the sum processing 2075 is called.

In Step 7702, the data to be sum-processed is separated in the byte length, and the total sum of the data in the byte unit is calculated.

In Step 7703, data in the byte size so as to make the total sum obtained in Step 7702 zero by adding is calculated.

In Step 7704, the data obtained in Step 7703 is written so as to add it to the last part of the data written in Step 7701.

Figure 24:
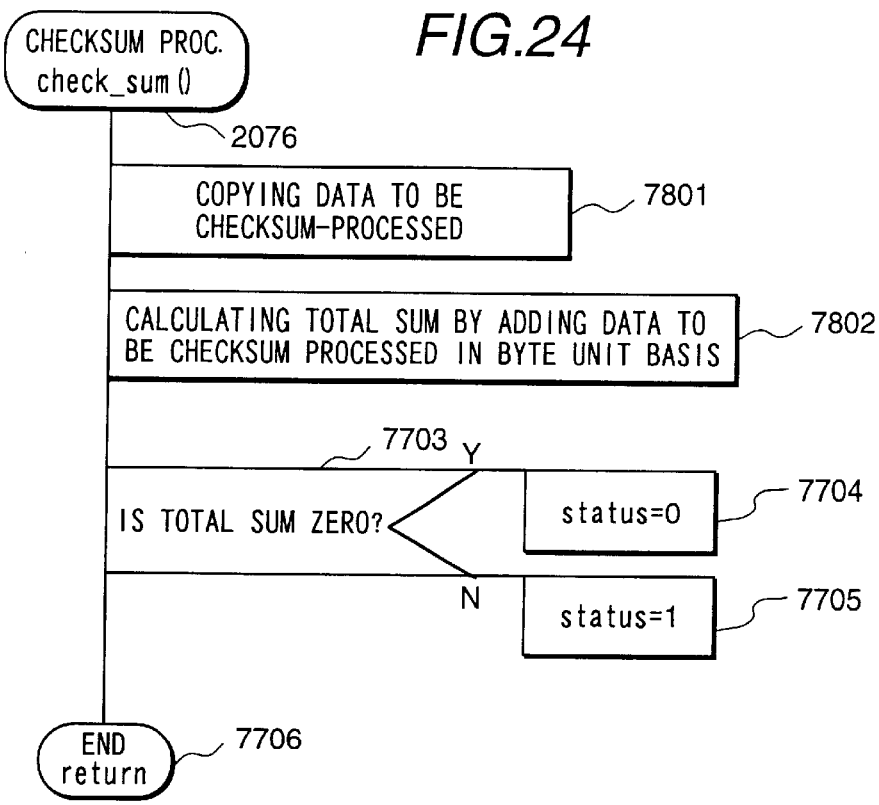
FIG. 24 is a flow chart showing the flow of the checksum processing 2076 of the embodiment of the highly reliable software in accordance with the present invention.

In the last, the checksum processing 2076 will be described in detail. The checksum processing corresponds to the error detection decoding processing described in Means to solve the Problems. The checksum processing is processing of separating data by a byte length, adding all the separated data in the byte unit, checking that the total sum becomes zero, and the data added at the sum processing is deleted. The carry at addition is neglected. FIG. 24 is a flow chart showing the flow of the checksum processing 2076. The checksum processing 2076 will be described, referring to FIG. 24.

In Step 7801, data to be checksum-processed is copied to a write target address. The write target address is passed as an argument when the sum processing 2075 is called.

In Step 7802, the data to be checksum-processed is separated in the byte length, and the total sum of the data in the byte unit is calculated.

In Step 7803, it is judged whether or not the total sum obtained in Step 7702 is zero.

If zero, a return parameter is set to zero in Step 7804.

If not zero, the return parameter is set to 1 in Step 7805.

In Step 7806, the return parameter is returned, and the processing is completed.

(c) OSEK-COM

The software construction of the OSEK-COM will be described below in detail. The OSEK-COM 2008 is composed of a plurality of message objects such as a message object a 2015, a message object b 2016, a message object c 2017 and so on, and the message communication processing 2090. Messages used in the present embodiment are two kinds of queued messages and unqueued messages. The queued message is a message requiring queuing, and is incapable of overwriting. The unqueued message is a message not requiring queuing, and is capable of overwriting.

Figure 4:
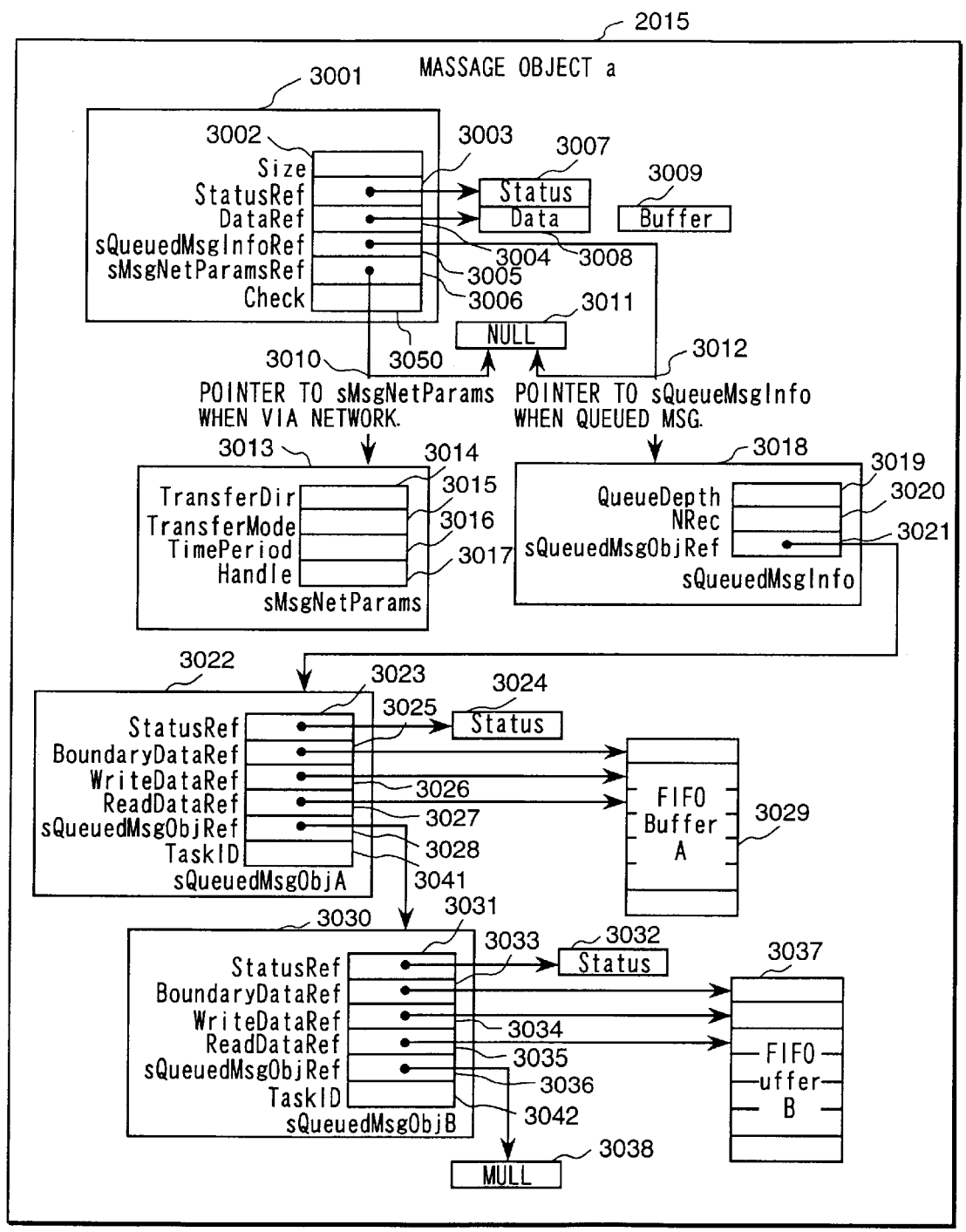
FIG. 4 is a block diagram showing the detailed construction of the message object a 2015 composing the OSEK-COM in the control unit of the embodiment of the highly reliable distributed system in accordance with the present invention.

FIG. 4 is a block diagram showing the detailed construction of the message object a 2015. The message object a 2015 is composed of sMsgObj 3001 for storing basic information of a message, Status 3007 for storing status information of the message, Data 3008 for storing a message data value, Buffer 3009 of a memory area for reading the message data value, sMsgParams 3013 for storing information when the message communicates with outside of the unit, sQueuedMsgInfo 3018 for storing information of the queued message, a plurality of sQueuedMsgObjs for storing FIFO information composing the queued message such as sQueuedMsgobj A 3022, sQueuedMsgobj B 3030 and so on, a plurality of Statuses for storing status information of the queued messages such as Status 3024, Status 3032 and so on, a plurality of FIFOBuffers for storing a data value of the queued message such as FIFOBuffer A 3029, FIFOBuffer B 3037 and so on, and a plurality of NULLs of zero such as NULL 3011, NULL 3033 and so on.

The Status 3007 is an area for storing a status of sMsgObj (any one of sending finished: E__OK, sending not finished yet: E__COM__LOCKED, in a case of a sent message; and a new message arriving: E__OK, a new message not arriving yet: E__COM__NOMSG, in a case of a received message). The Status 3024 is an area for storing a status of sQueuedMsgobj A 3022 (any one of a new message arriving: E__OK, a new message not arriving yet: E__COM__NOMSG, buffer overflow: E__COM__LIMIT). The Status 3032 is an area for storing a status of sQueuedMsgObj A 3030 (a new message arriving: E__OK, a new message not arriving yet: E__COM__NOMSG, buffer overflow: E__COM__LIMIT). The Data 3008 is an area for storing data of a message. The Buffer 3009 is a buffer of the Data 3008 when the message is an unqueued message (3012). The FIFOBuffer A 3029 is a buffer of the Data 3008 when the message is a queued message (3012). The FIFOBuffer B 3037 is a buffer of the Data 3008 when the message is a queued message (3012).

The sMsgObj 3001 is composed of Size 3002, StatusRef 3003, DataRef 3004, sQueuedMsgRef 3005, sMsgNetParmsRef 3006 and Check 3050. The Size 3002 is an area for storing data size of a message. The StatusRef 3003 is a pointer to the Status 3007. The DataRef 3004 is a pointer to the Data 3008. The sQueuedMsgInfoRef 3005 is a pointer to the sQueuedMsgInfo 3018 when the message is a queued message (3012). The sQueuedMsgInfoRef 3005 is a pointer to the MULL 3011 when the message is an unqueued message (3012). The sMsgNetParamsRef 3006 is a pointer to the sMsgNetParams 3013 when message sending or message receiving is through the network 2005 (3010). The sMsgNetParamsRef 3006 is a pointer to the NULL 3011 when message sending or message receiving is not through the network 2005 (3010). The Check 3050 is an area for storing presence or absence of use of the highly reliable communication function.

The sMsgNetParams 3013 is composed of TransferDir 3014, TransferMode 3015, TimePeriod 3016 and Handle 3017. The TransferDir 3014 is an area for storing whether the message is a sent message or the message is a received message. The TransferMode 3015 is an area for storing periodical message sending is used or periodical message sending is not used. When the periodical message sending is used, the application program can execute message sending ever periodic time. When the periodical message sending is used, the TimePeriod 3016 is an area for storing the periodic time. The Handle 3017 is an area for storing a message ID of the message.

The sQueuedMsgInfo 3018 is composed of QueuedDepth 3019, Nrec 3020 and sQueuedMsgObjRef 3021. The QueuedDepth 3019 is an area for storing a depth of queuing of the FIFOBuffer. The Nrec 3020 is an area for storing number of message object users. For example, when two application programs of AP a 2012, AP b 2013 use one message object of the message object a 2015, the NRc 3020 is 2. FIG. 4 shows a case where the NRc 3020 is 2, the message object a 2015 has two sQueuedMsgObjs (3022, 3030), two Statuses (3024, 3032) and two FIFOBuffers (3029, 3037). The sQueuedMsgObjRef 3021 is a pointer to the sQueuedMsgObj.

The construction of the sQueuedMsgObj will be described, taking the sQueuedMsgObj A 3022 as an example. The sQueuedMsgObj A 3022 is composed of StatusRef 3023, BoundaryDataRef 3025, WriteDataRef 3026, ReadDataRef 3027, sQueuedMsgObjRef 3028 and TaskID 3041.

The StatusRef 3023 is a pointer to the Status 3024. The BoundaryDataRef 3025 is a top address of the FIFOBuffer A 3029. The WriteDataRef 3026 is a write address of the FIFOBuffer A 3029. The ReadDataRef 3027 is a read address of the FIFOBuffer A 3029. The sQueuedMsgobjRef 3028 is a pointer to the sQueuedMsgobj B 3030. The construction of the sQueuedMsgObj B 3030 is the same as the construction of the sQueuedMsgobj A 3022. However, sQueuedMsgobjRef 3036 is a pointer to NULL 3038. The TaskID 3041 is an area for storing a task ID receiving the message.

Figure 28:
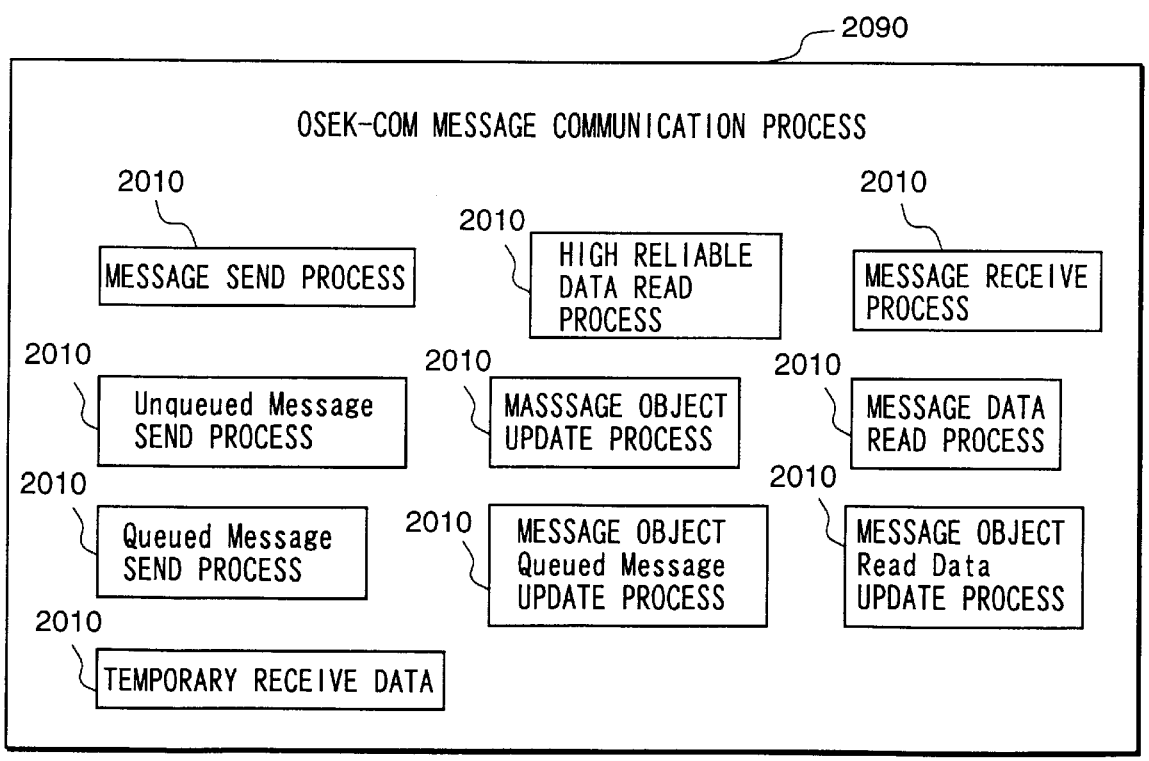
FIG. 28 is a detailed block diagram showing the construction of the message communication processing 2090 of the embodiment of the OSEK-COM in accordance with the present invention.

The message communication processing 2090 of the OSEK-COM will be described below. FIG. 28 shows the software construction of the message communication processing 2090. The message communication processing 2090 is composed of message send processing 2010, message receive processing 2011, Unqueued message send processing 2091, queued message send processing 2092, message object updating processing 2093, message object queued message updating processing 2094, message data read processing 2095, message object read data updating processing 2096, highly reliable CAN data read processing 2097 and temporary receive data 2098. The temporary receive data 2098 is a message data memory area which is reserved when the message icommunication processing 2090 is called, and the temporary receive data 2098 is deleted when the message communication processing 2090 is completed.

Each processing of the message communication processing 2090 of the OSEK-COM will be described below.

Firstly, the message send processing 2010 will be described in detail. The message send processing 2010 is a program executed by the highly reliable communication software 2080 to actually perform message sending using the OSEK-COM 2008. In this embodiment, it is assumed that the message send processing of the OSEK-COM is executed by a task of the highly reliable communication software 2080 which calls the message send processing. FIG. 5 is a flow chart showing the flow of the message send processing 2010. The message send processing 2010 will be described, referring to FIG. 5.

Initially, in Step 100, a message object to be used in massage sending is determined from a message name. The message name is passed as an argument when the message send processing 2010 is called. The message send processing will be explained below, taking the message object a as an example.

In Step 101, referring to the sMsgNetParamsRef 3006 it is judged whether the massage sending is communication within the unit or through the network 2005 (3010).

If communication within the unit, in Step 102 the sent data is written in the Data 3008 using the message object updating processing 2093.Therein, the address storing the sent data is passed as an argument when the message send processing is called.

When the message to be sent is an unqueued message (3012), the Data 3008 is written in the Buffer 3009.

When the message to be sent is a queued message (3012), the Data 3008 is written in the FIFOBuffers (3029, 3037).

If the message sending is not communication within the unit, that is, if the message sending is communication through the network, in Step 103 it is judged referring to the TransferDir 3014 whether or not the massage to be sent is a sent message.

Next, in Step 104, it is judged whether or not the message to be sent is a queued message (3012).

If the message to be sent is a queued message (3012), in Step 105 the queued message sent processing is executed using the queued message send processing 2092.

If the message to be sent is an unqueued message (3012), in Step 106 the unqueued message sent processing is executed using the unqueued message send processing 2091.

Figure 6:
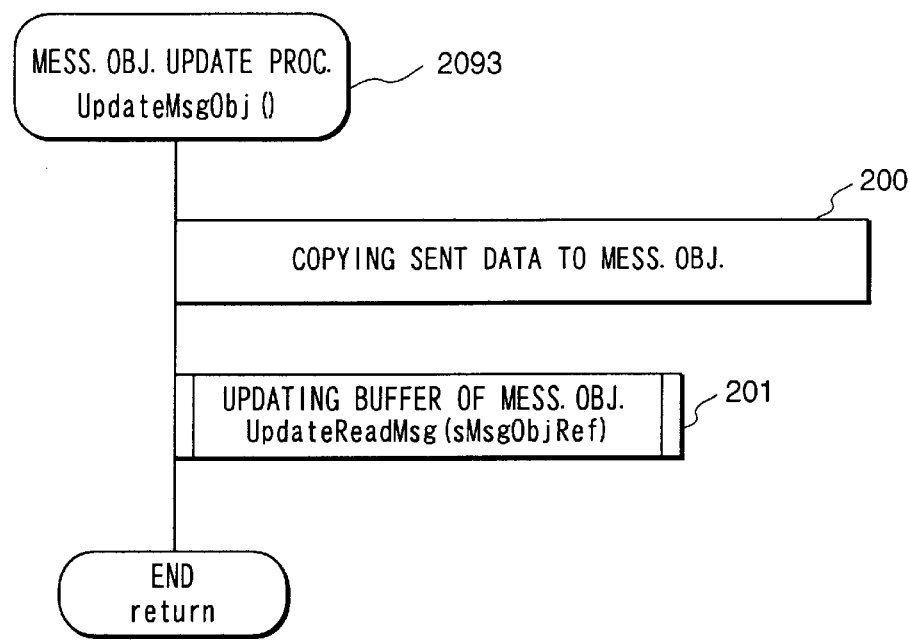
FIG. 6 is a flow chart showing the flow of the message object updating processing 2093 of the embodiment of the OSEK-COM in accordance with the present invention.

FIG. 6 is a flow chart showing the detailed flow of the message object updating processing 2093.

Initially, in Step 200, the data of the message to be sent is written in the Data 3008. The address storing the data of the message to be sent is passed as an argument when the message object updating processing 2093 is called.

If the message to be sent is an unqueued message (3012), in Step 201 the Data 3008 is written in the Buffer 3009 using the message object read data updating processing 2096.

If the message to be sent is a queued message (3012), the Data 3008 is written in the FIFOBuffers (3029, 3037).

Figure 7:
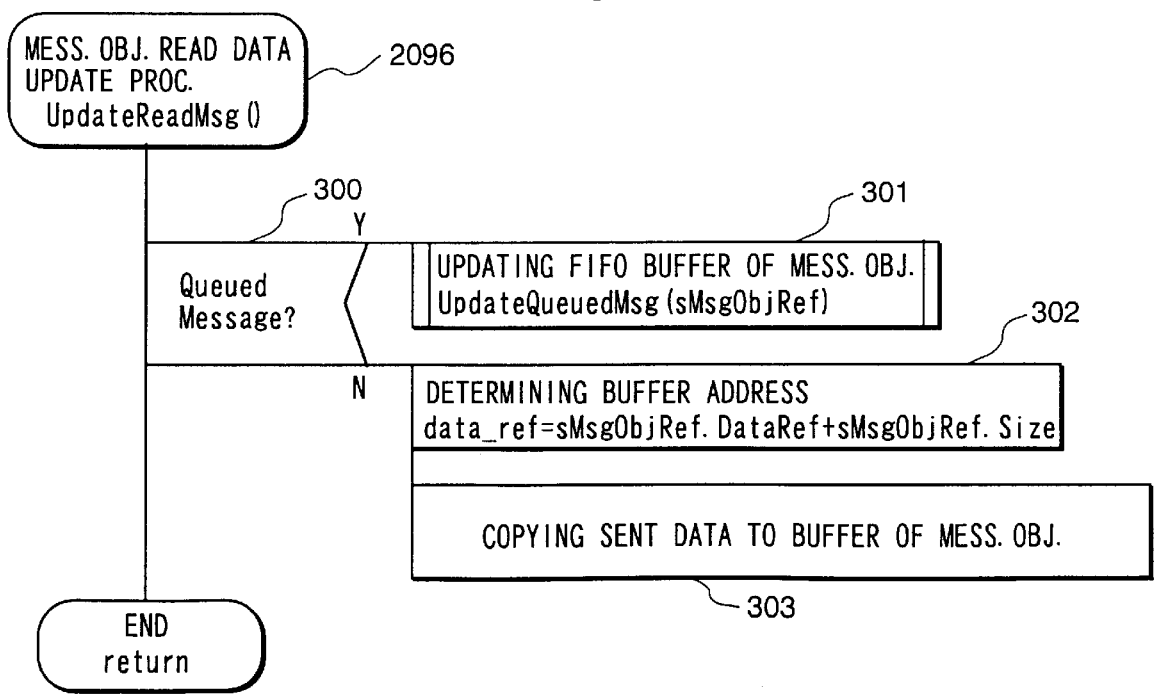
FIG. 7 is a flow chart showing the flow of the message object read data updating processing 2096 of the embodiment of the OSEK-COM in accordance with the present invention.

FIG. 7 is a flow chart showing the detailed flow of the message object read data updating processing 2096. Explanation will be made, taking the message object a 2015 as an example.

Initially, in Step 300, it is judged whether or not the message to be sent is a queued message (3012).

If the message to be sent is a queued message, in Step 301 the Data 3008 is written in the FIFOBuffers (3029, 3037) using the message object queued message updating processing 2094.

If the message to be sent is an unqueued message, in Step 302 a write address of the Buffer 3009 is determined referring to the DataRef 3004, the Size 3002.

Next, in Step 303, the Data 3008 is written in the Buffer 3009.

Figure 8:
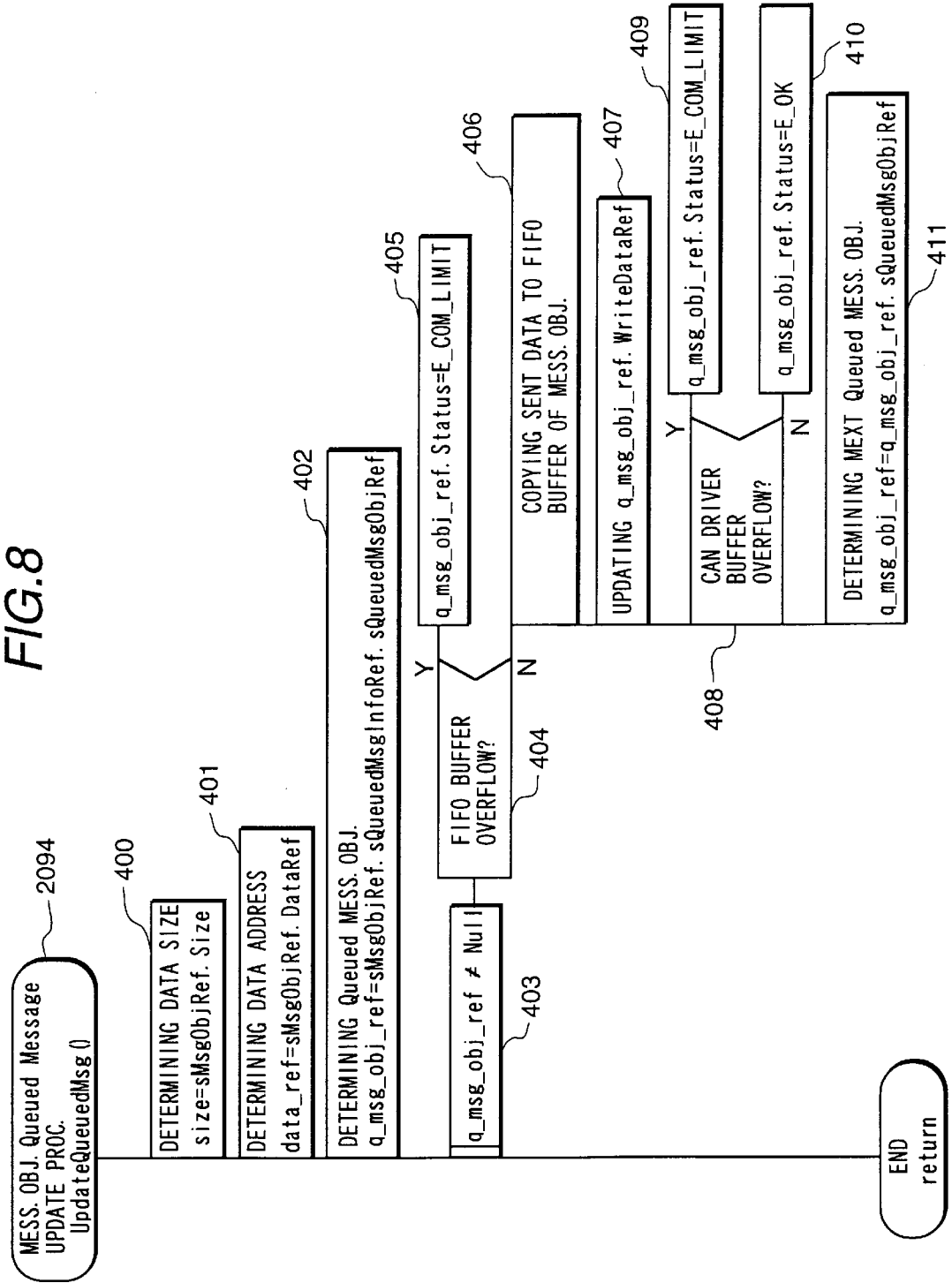
FIG. 8 is a flow chart showing the flow of the message object QueuedMessage updating processing 2094 of the embodiment of the OSEK-COM in accordance with the present invention.

FIG. 8 is a flow chart showing the detailed flow of the message object QueuedMessage updating processing 2094.

Explanation will be made, taking the message object a 2015 as an example.

In Step 400, a data size of the message to be sent is determined by referring to the Size 3002.

In Step 401, an address of the Data 3008 is determined by referring to the DataRef 3004.

In Step 402, an sQueuedMsgobje to be updated first is determined. It is assumed that the sQueuedMsgObje to be updated first is sQueuedMsgObj A 3022 pointed by the sQueuedMsgObjRef 3021.

Next, while the condition of Step 403 holds, that is, while the above decided address is not NULL, the procedure from Step 404 to Step 411 is repeated to write the Data 3008 to the FIFOBuffers (3029, 3037). The processing from Step 404 to Step $11 will be described, taking a procedure of writing from the Data 3008 to the FIFOBuffer A 3029 as an example.

In Step 404, it is judged whether or not the FIFOBuffer overflows. That is, it is judged whether or not the FIFOBuffer is fully filled.

If overflows, in Step 405 a value expressing that the FIFOBuffer A 3029 overflows is written in the Status 3024.

If not overflows, in Step 406 the Data 3008 is written to the FIFOBuffer A 3029 by referring to the WriteDataRef 3026.

Then, in Step 407, the WriteDataRef 3026 is updated.

In Step 408, by referring to the LIMIT 4007 of the message attribute table 2021 it is judged whether or not the buffer a 2018 of the CAN driver 2009 overflows.

If overflows, in Step 409 a value expressing that the buffer a 2018 overflows is written in the Status 3024.

If does not overflow, in Step 410 a value expressing that the buffer a 2018 does not overflow is written in the Status 3024.

In Step 411, an address of the sQueuedMsgobj B 3030 is determined by referring to the sQueuedMsgObjRef 3028.

Figure 9:
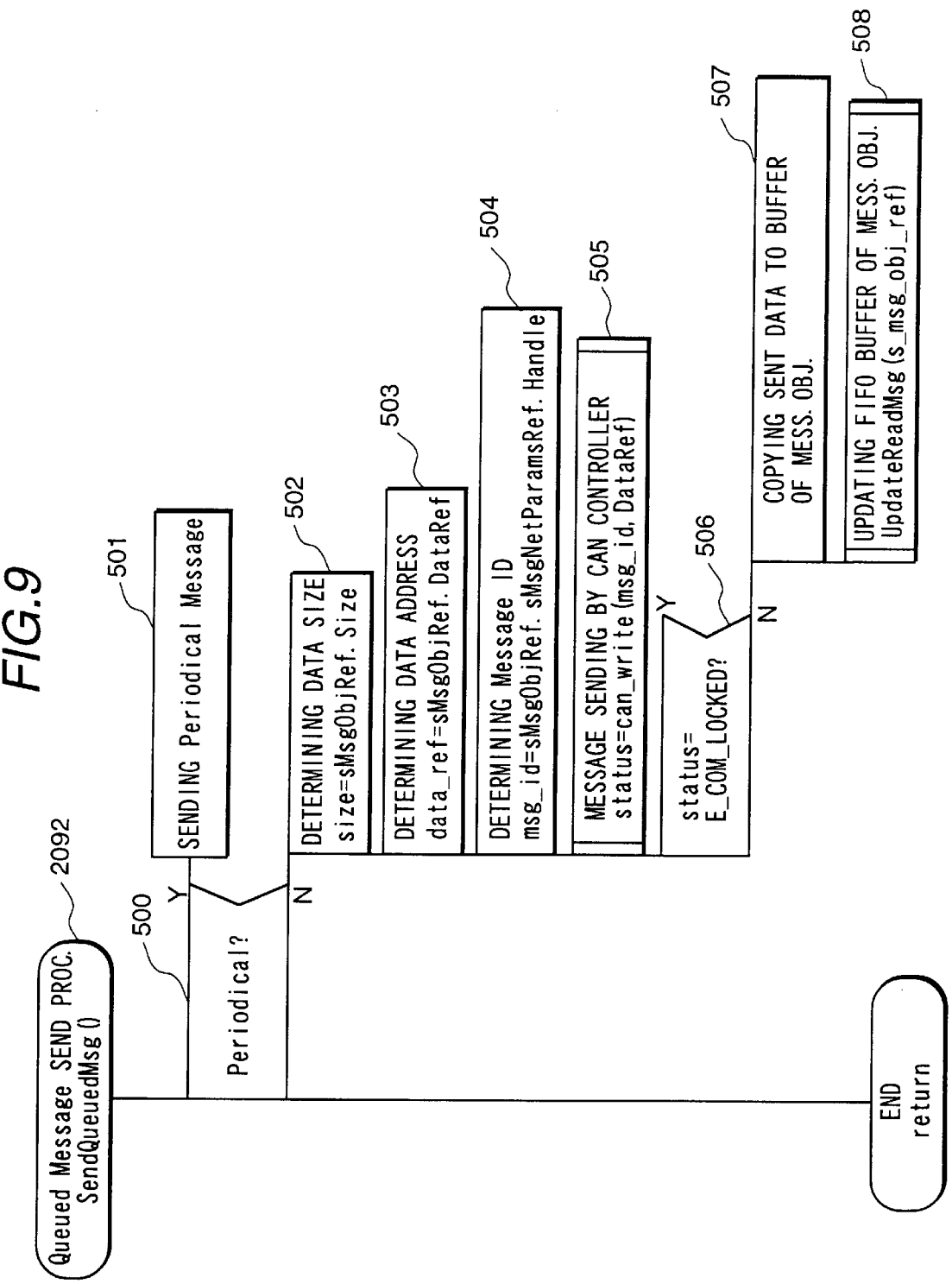
FIG. 9 is a flow chart showing the flow of the QueuedMessage send processing 2092 of the embodiment of the OSEK-COM in accordance with the present invention.

FIG. 9 is a flow chart showing the detailed flow of the QueuedMessage send processing 2092. Explanation will be made, taking the message object a 2015 as an example.

In Step 500, it is judged by referring to the TransferMode 3015 whether or not periodical message sending is used.

If the periodical message sending is used, in Step 501 the periodical message sending is executed by referring to the TimePeriod 3016.

If the periodical message sending is not used, in Step 502 a data size of the message to be sent is determined by referring to the Size 3002.

Next, in Step 503, an address of the Data 3008 is determined by referring to the DataRef 3004.

In Step 504, a message ID of the message to be sent is determined by referring to the Handle 3017.

In Step 505, the message send processing 2032 of the CAN driver 2009 is called, and the message is sent to the network 2005 using the CAN controller 2003. The message send processing 2032 of the CAN driver will be described later.

In Step 506, it is judged from a return parameter of Step 505 whether or not the message to be sent is written in the Data 6003.

If written, initially in Step 507 the data of the message to be sent is written in the Data 3008. An address of the message data to be sent is passed as an argument when the QueuedMessage send processing 2092 is called.

Next, in Step 508, the Data 3008 is written in the FIFOBuffers (3029, 3037) using the message object read data updating processing 2096.

Figure 10:
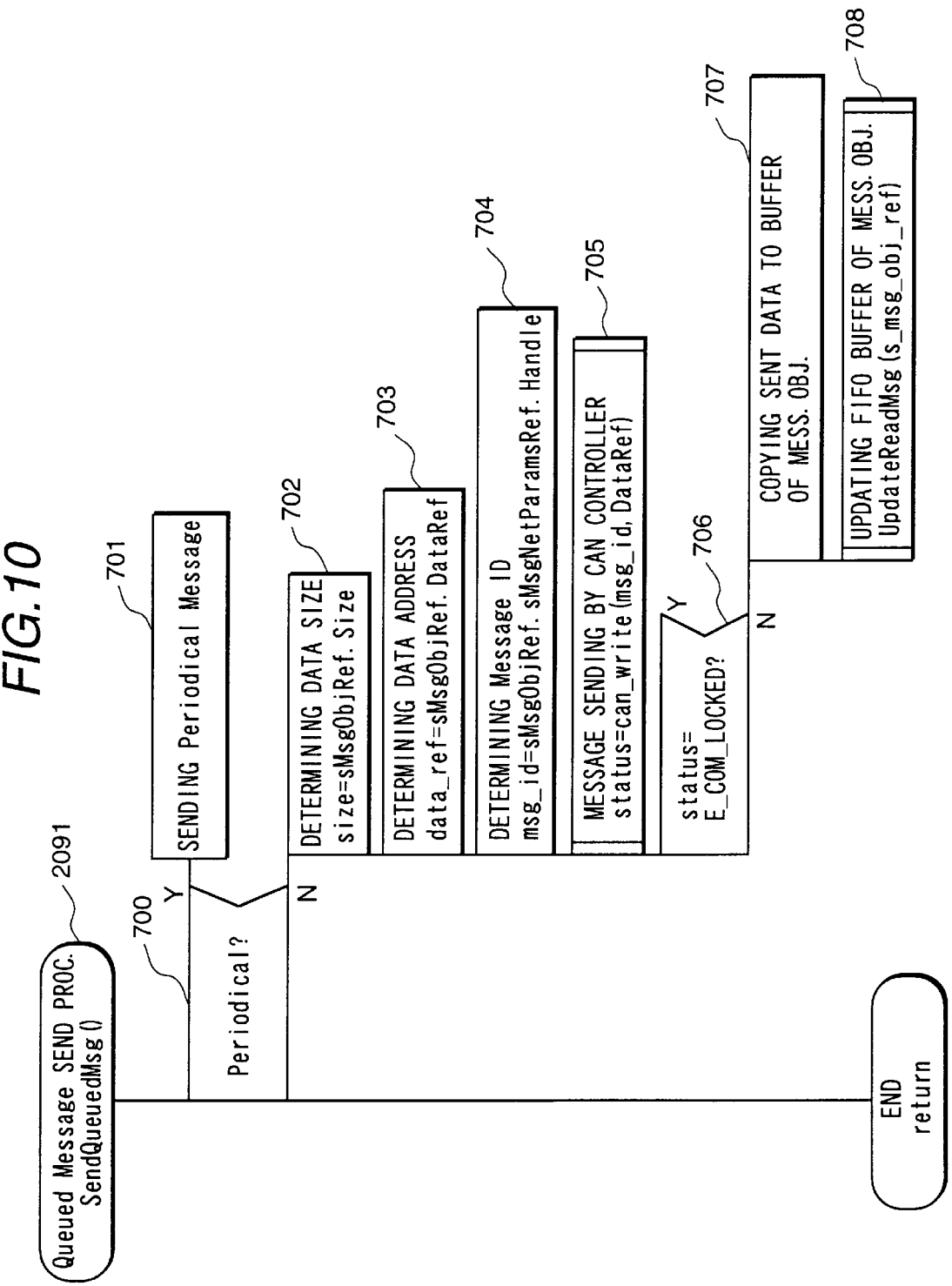
FIG. 10 is a flow chart showing the flow of the UnqueuedMessage send processing 2091 of the embodiment of the OSEK-COM in accordance with the present invention.

FIG. 10 is a flow chart showing the detailed flow of the UnqueuedMessage send processing 2091. Explanation will be made, taking the message object a 2015 as an example.

Initially, in Step 700, it is judged by referring to the TransferMode 3015 whether or not periodical message sending is used.

If the periodical message sending is used, in Step 701 the periodical message sending is executed by referring to the TimePeriod 3016.

If the periodical message sending is not used, in Step 702 a data size of the message to be sent is determined by referring to the Size 3002.

Next, in Step 703, an address of the Data 3008 is determined by referring to the DataRef 3004.

In Step 704, a message ID of the message to be sent is determined by referring to the Handle 3017.

In Step 705, the message is sent to the network 2005 using the message send processing 2032 of the CAN driver 2009.

In Step 706, it is judged from a return parameter of Step 705 whether or not the message to be sent is written in the Data 6003.

If written, initially in Step 707 the data of the message to be sent is written in the Data 3008. An address of the message data to be sent is passed as an argument when the QueuedMessage send processing 2092 is called.

Next, in Step 708, the Data 3008 is written in the FIFOBuffer 3009 using the message object read data updating processing 2096.

The message receive processing 2011 of the OSEK-COM will be described below in detail. The message receive processing 2011 is a program executed by the highly reliable communication software 2080 to actually perform message receiving using the OSEK-COM 2008. In this embodiment, it is assumed that the message receive processing of the OSEK-COM is executed by a task of the highly reliable communication software 2080 which calls the message receive processing. FIG. 11 is a flow chart showing the flow of the message receive processing 2011. The message receive processing 2011 will be described, referring to FIG. 11.

Initially, in Step 900, a message object to be used in massage receiving is determined from a message name. The message name is passed as an argument when the message receive processing 2011 is called. The message receive processing will be explained below, taking the message object a as an example.

Next, in Step 901, it is judged by referring to the TransferDri 3014 whether or not the message to be received is a received message.

If a received message, in Step 902 an address of the Data 3008 is determined by referring the DataRef 3004.

In Step 903, a message ID of the message to be received is determined by referring to the Handle 3017.

In Step 908, it is judged by referring to the Check 3050 whether or not highly reliable processing is used.

If there is checking, in Step 909 the data to be received is written in the Data 3008 using the highly reliable CAN data read processing 2097.

If there is not checking, in Step 904 the data of the message to be received is written in the Data 3008 using the message receive processing 2033 of the CAN driver.

The message receive processing 2033 of the CAN driver will be described later.

In Step 905, it is judged from a return parameter of Step 904 whether or not the data of the message to be received is written from the buffer a 2018 to the Data 3008.

If written, in Step 906 the Data 3008 is written to the buffer 3009 using the message object read data updating processing 2096 when the message to be received is an unqueued message (3012). When the message to be received is a queued message (3012), the Data 3008 is written to the FIFOBuffers (3029, 3037).

In Step 907, the data in the message object is written to the received data using the message data read processing 2095. The address of the received data is passed as an argument when the message receive processing 2011 is called.

If the message to be received is not a received message in Step 901, in Step 910 it is judged by referring to the TransferDir 3014 whether or not the message to be received is a sent message.

If a sent message, in Step 911 data existing in the sending/receiving mailbox 2023 of the CAN controller is written in the received data using data read processing 2035 in the CAN controller. The address of the received data is passed as an argument when the message receive processing 2011 is called.

In Step 912, the return parameter is set to a value expressing normal completion.

If not sent message, in Step 913 the data in the message object is written to the received data using the message data read processing 2095. The address of the received data is passed as an argument when the message receive processing 2011 is called.

Figure 12:
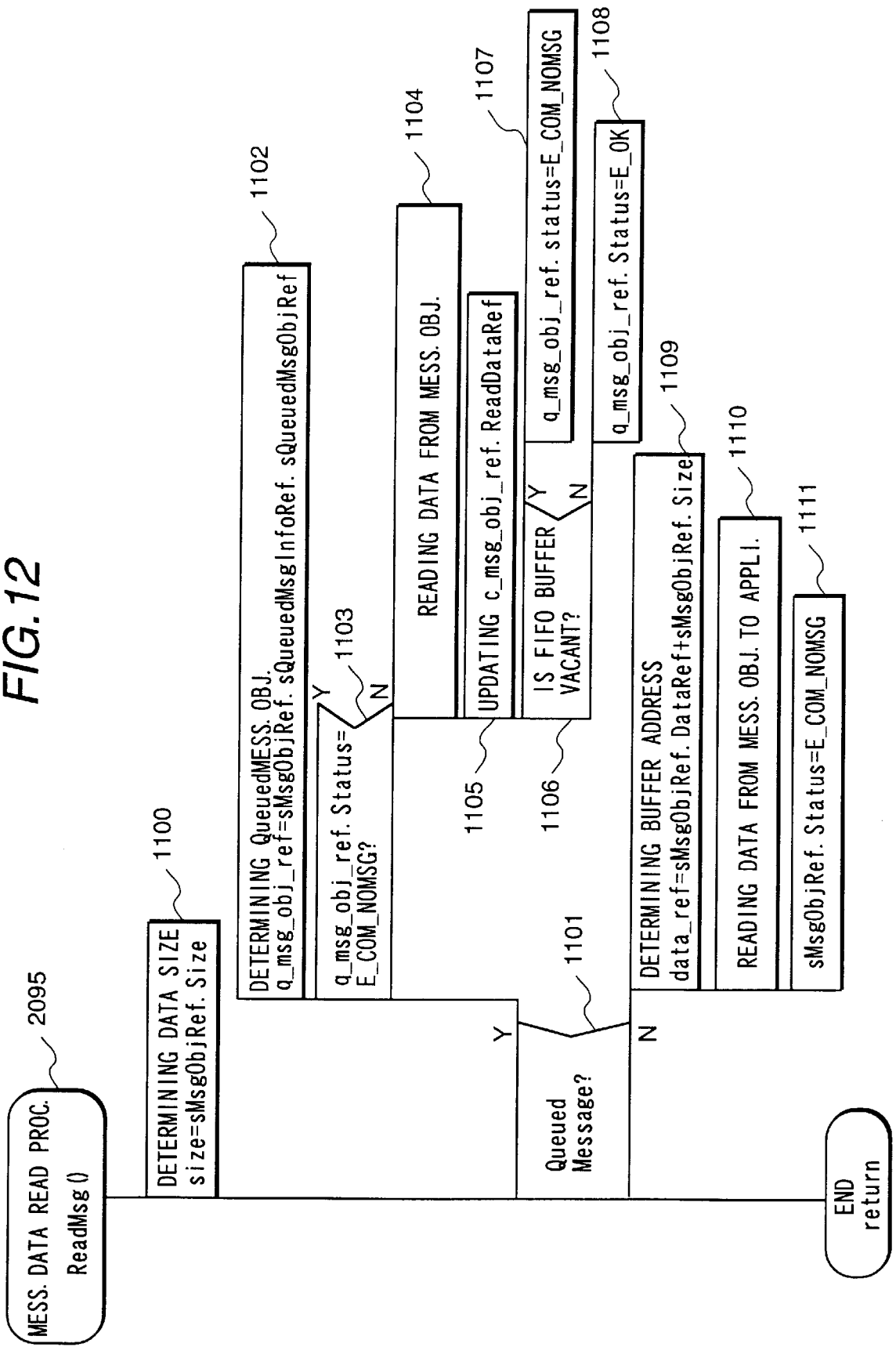
FIG. 12 is a flow chart showing the flow of the message data read processing 2095 of the embodiment of the OSEK-COM in accordance with the present invention.

FIG. 12 is a flow chart showing the detailed flow of the message data read processing 2095. Explanation will be made, taking the message object a 2015 as an example.

Initially, in Step 1100, a data size of the received message is determined by referring to the Size 3002.

Next, in Step 1101, it is judged whether or not the message to be received is a queued message (3012).

If a queued message, in Step 1102 an address of sQueuedMsgObj is determined so that the task ID executing agrees with the TaskIDs (3041, 3042) of the sQueuedMsgObjRefs (3022, 3030). In this example, it is assumed that the address of sQueuedMsgobj is the address of the sQueuedMsgobj A 3022.

Next, instep 1103, it is judged by referring to the Status 3024 whether or not there is a received message in the FIFOBuffer A 3029.

If there is a received message in the FIFOBuffer A 3029, in Step 1104 the data is initially written from the FIFOBuffer A 3029 to the received data storing area by referring to the ReadDataRef 3027. An address of the received data storing area is passed as an argument when the message data read processing 2095 is called.

Next, in Step 1105, the ReadDataRef 3027 is updated.

Then, in Step 1106, it is judged whether or not the FIFOBuffer A 3029 is vacant.

If vacant, in Step 1107 a value expressing that the FIFOBuffer A 3029 is vacant is stored in the Status 3024.

If not vacant, in Step 1108 a value expressing that the FIFOBuffer A 3029 is not vacant is stored in the Status 3024.

If the judgment in Step 1101 shows that the message to be received is not a queued message, in Step 1109 a read address of the Buffer 3009 is initially determined by referring to the DataRef 3004, the Size 3002.

Next, in Step 1110, the data is written from the Buffer 3009 to the received data storing area. An address of the received data storing area is passed as an argument when the message data read processing 2095 is called.

Then, in Step 111, a value expressing that the Buffer 3009 is vacant is stored in the Status 3007.

Figure 26:
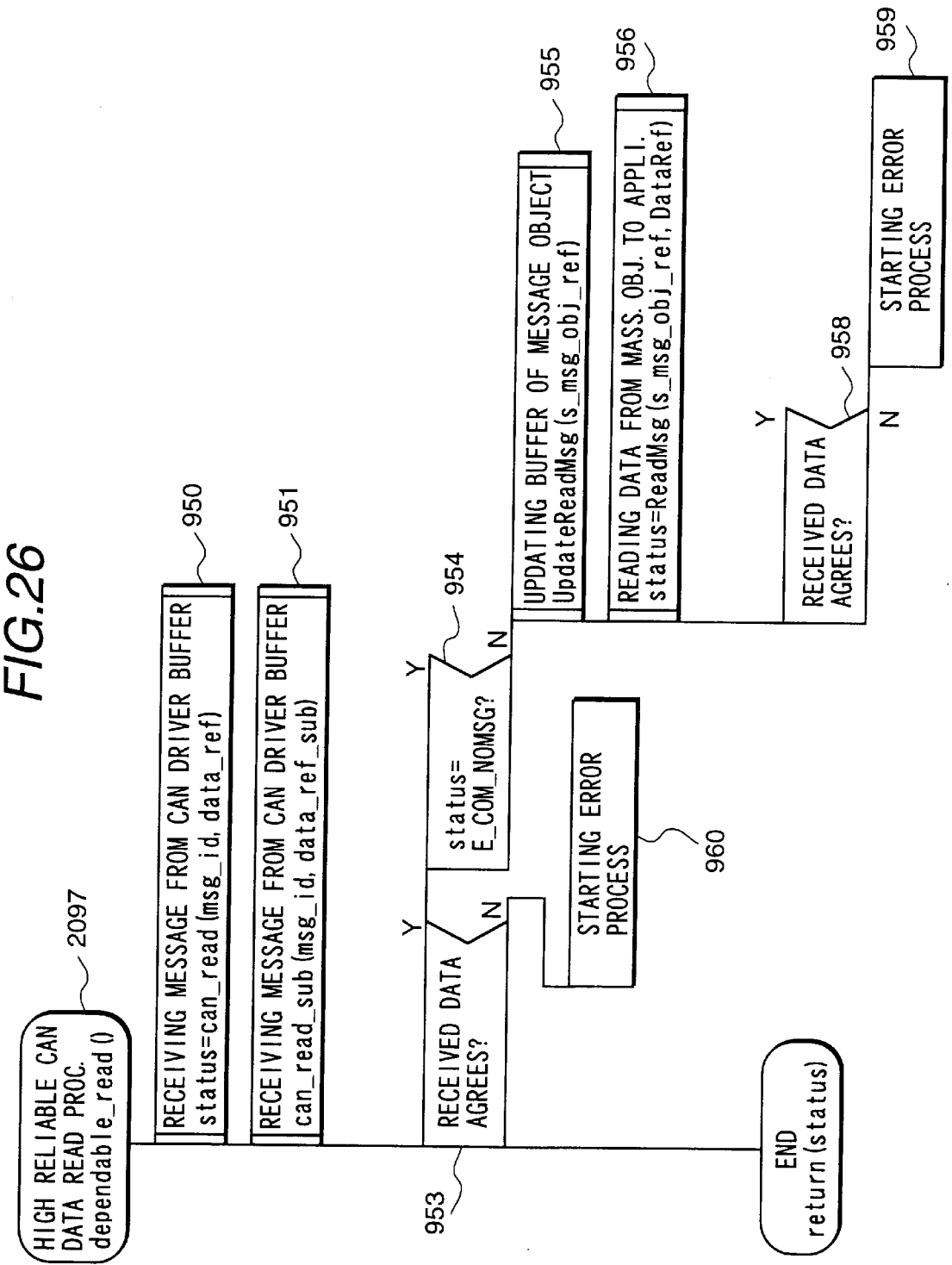
FIG. 26 is a flow chart showing the flow of the highly reliable data read processing 2097 of the embodiment of the OSEK-COM in accordance with the present invention.

FIG. 26 is a flow chart showing the detailed flow of the highly reliable data read processing 2097. Explanation will be made, taking the message object a 2015 and the buffer a 2018 as an example.

Initially, in Step 950, data of the message to be received is written from the buffer a 2018 to the Data 3008 of the message object a using the message send processing 2032 of the CAN driver.

Next, in Step 951, the data of the message to be received is written from the buffer a to the temporary receive data 2098 using the CAN data read processing 2036.

In Step 953, it is judged by comparison whether or not the data value of the Data 3008 agrees with the data value of the temporary receive data 2098.

If agrees, in Step 954 it is judged from a return parameter of Step 950 whether or not the data of the message to be received is written from the buffer a to the Data 2008.

If written, in Step 955 the Data 3008 is written to the Buffer 3009 using the message object read data updating processing 2096 when the message to be received is an unqueued message (3012).

The Data 3008 is written to the FIFOBuffers (3029, 3037) when the message to be received is a queued message (3012).

In Step 956, the data is written from the message object a 2015 in the received data storing area using the message object read processing 2095. An address of the received data storing area is passed as an argument when the high CAN data read processing 2097 is called.

In Step 958,it is judged by comparison whether or not the data value of the received data written in Step 956 agrees with the data value of the Data 3008.

If does not agree, in Step 959 the communication error processing 2073 is started.

In addition, if does not agree in Step 953, in Step 960 the communication error processing 2073 is also started.

(d) CAN Driver

The CAN driver 2009 will be described below in detail. The CAN driver 2009 is software for executing sending and receiving a message using the CAN controller 2003. As shown in FIG. 1, the CAN driver 2009 is composed of the buffer 2031, the message attribute table 2010 and the message communication processing 2040.

The buffer 2031 is composed of a plurality of buffers such as a buffer a 2018, a buffer b 2019, a buffer c 2020 and so on. Number of the buffers prepared for composing the buffer 2031 is equal to number of mailboxes composing the send/receive mailbox 2023, and each of the buffers is used as a buffer dedicated to each of the mailboxes. For example, in a case where the buffer a 2018 is used as the dedicated buffer of the mailbox a 2028, the buffer a 2018 is a data storing area of a message similar to the Data 6003 of the mailbox a 2028.

FIG. 13 is a detailed view showing the construction of the message attribute table 2021. The message attribute table 2021 is composed of mailbox number 4001, MessageID 4002, DataSize 4003, QUEUED 4004, LOCKED 4005, NOMSG 4006, LIMIT 4007 and CHECK 4008. The mailbox number 4001 is an area storing a mailbox number of each of the mailboxes. The MessageID 4002 is an area storing a message ID registered in the mailbox on the mailbox number basis. The DataSize 4003 is an area for storing a data size of a message registered in the mailbox on the mailbox number basis. The MessageID 4002 and the Datasize 4003 are memory areas similar to, for example, the MessageID 6001 and the DataSize 6002 composing the mailbox a 2028. The QUEUED 4004 is an area for storing information on whether a message is a queued message or an unqueued message on the mailbox number basis. When a message is a queued message, the bit is set. The LOCKED 4005 is an area for storing information on whether the message stored in the mailbox on the mailbox number basis is under execution of message sending to the network 2005 by receiving message sending request or is out of execution of message sending to the network 2005 by receiving no message sending request. The LOCKED 4005 is bit-set when the message stored in the mailbox is under execution of message sending to the network 2005 by receiving message sending request. The NOMSG 4006 is an area for storing information on whether a received message occupies the buffer 2031 on the mailbox number basis or does not occupy. The NOMSG 4006 is bit-set when no received message occupies the buffer 2031. The LIMIT 4007 is an area for storing information on whether a received message occupies the buffer 2031 on the mailbox number basis up to a limit or does not occupy up to a limit. The LIMIT 4007 is bit-set when received message occupies each buffer of the buffer 2031 up to the limit. Since the present embodiment deals with both of queued messages and unqueued messages, the buffer 2031, for example, needs to be provided with FIFO buffers queuing queued messages. Unqueued messages are messages not requiring being queued. In a case where the buffers of the buffer 2031 are implemented with FIFO buffers, the LIMIT 4007 is bit-set when the FIFO buffers overflow. The CHECK 4008 is an area for storing information whether or not the highly reliable function of communication is used. For example, it is a memory area similar to the check 3050 of the message object a 2015.

The message communication processing 2040 of the CAN driver will be described below. The message communication processing 2040 is composed of message send processing 2032, message receive processing 2033, message send and receive interruption processing 2034, in-CAN-controller data read processing 2035, CAN data read processing 2036, message-send instruction processing 2037 and highly reliable memory copying processing 2038.

Figure 14:
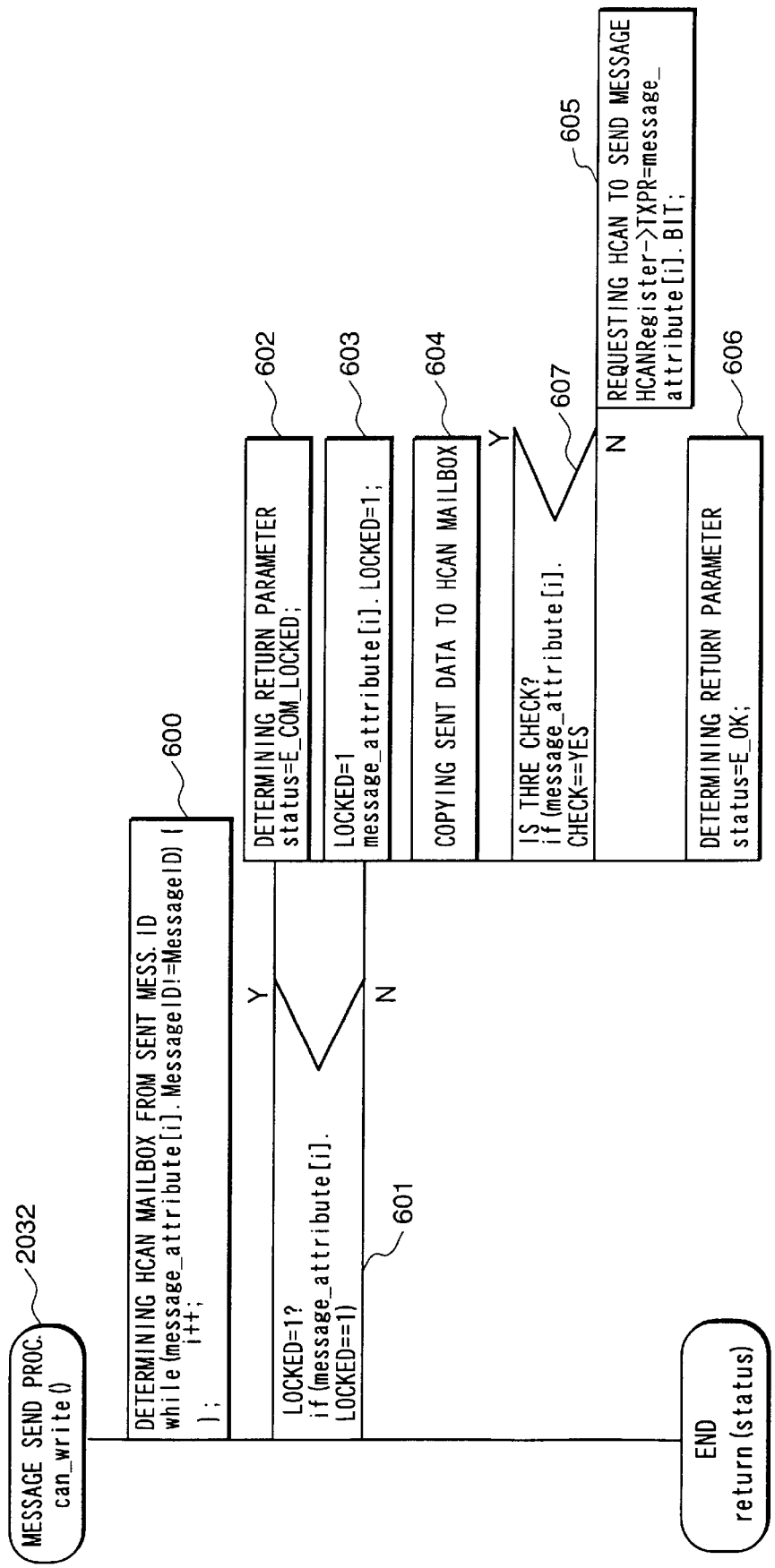
FIG. 14 is a flow chart showing the flow of the message send processing 2032 of the embodiment of the CAN driver in accordance with the present invention.

Initially, the message send processing 2032 of the CAN driver will be described in detail. The message send processing 2032 is processing for sending a sent data. FIG. 14 is a flow chart showing the flow of the message send processing 2032 of the CAN driver. The send processing of the CAN driver will be described, referring to FIG. 14.

Initially, in Step 600, a mailbox number is determined from a message ID of a message to be dent using the message attrubute table 2021.

Next, in Step 601, it is judged whether or not the LOCKED 40005 is bit-set. If bit-set, in Step 602 a value expressing that the message to be sent can not be written in the Data 6003 is stored in the return parameter because the sent data stored in the Data 6003 of the mailbox 2023 is nor sent yet.

If not bit-set, initially in Step 603 the bit is set in the LOCKED 4005.

Next, in Step 604, data in a write source is written in the Data 6003. The address of the data in the write source is passed as an argument when the send processing 2032 of the CAN driver is called.

In Step 607, it is judged by the CHECK 4008 whether or not the highly reliable function of communication is used.

If the highly reliable function of communication is not used, in Step 605 TXPR 5002 is bit-set to request the CAN controller 2003 to perform message sending to the network 2005.

In Step 606, a value expressing that the message to be sent is written to the Data 6003 is stored in the return parameter.

Figure 15:
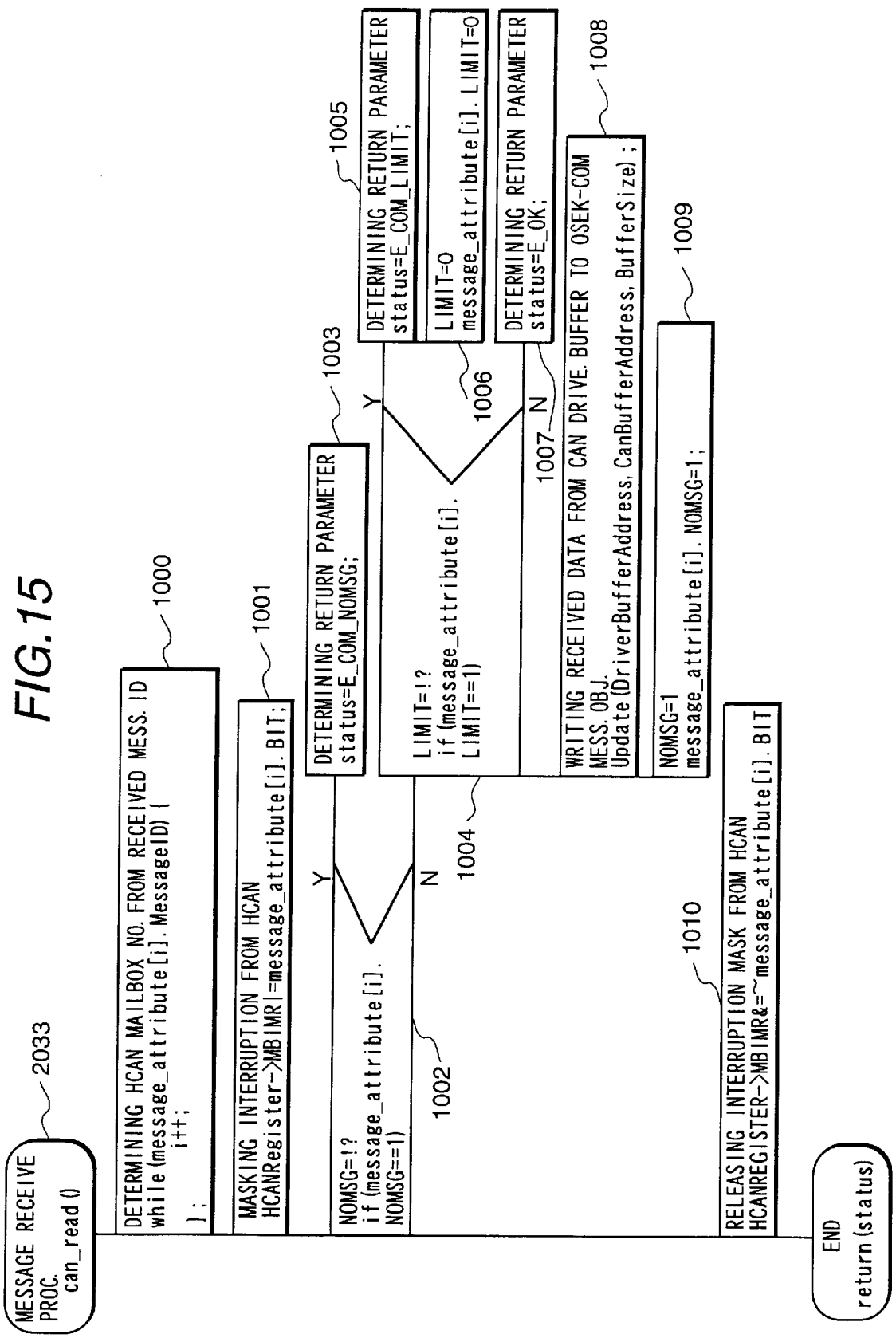
FIG. 15 is a flow chart showing the flow of the message receive processing 2033 of the embodiment of the CAN driver in accordance with the present invention.

The message receive processing 2033 of the CAN driver will be described below in detail. FIG. 15 is a flow chart showing the flow of the message receive processing 2033. The message receive processing of the CAN driver will be described, referring to FIG. 15. As an example, it is assumed that the received message uses the buffer a 2018.

Initially, in Step 1000, a mailbox number is determined from a message ID of the message to be received using the message attribute table 2021.

In Step 1001, a bit is set to MBIMR 5005.

In Step 1002, it is judged whether or not a bit is set to the NOMSG 4006.

If bit-set in the judgment in Step 1002, in Step 1003 a value expressing that the message is not written in the buffer a 2018 is stored in the return parameter.

If not bit-set in the judgment in Step 1002, initially in Step 1004 it is judged whether or not the LIMIT is bit-set.

If bit-set in the judgment in Step 1004, initially in Step 1005 a value expressing that the buffer a 2018 overflows is stored in the return parameter.

Next, in Step 1006, the LIMIT 4007 is cleared.

If the bit is not set in the judgment in Step 1004, in Step 1007 a value expressing the buffer a 2018 does not overflow is stored in the return parameter.

In Step 1008, the message to be received is written from the buffer a 2018 to the received data storing area. An address of the received data storing area is passed as an argument when the message receive processing 2033 is called.

In Step 1009, the NOMSG 4006 is bit-set.

In Step 1010, the MBIMR 5005 is cleared.

Figure 16:
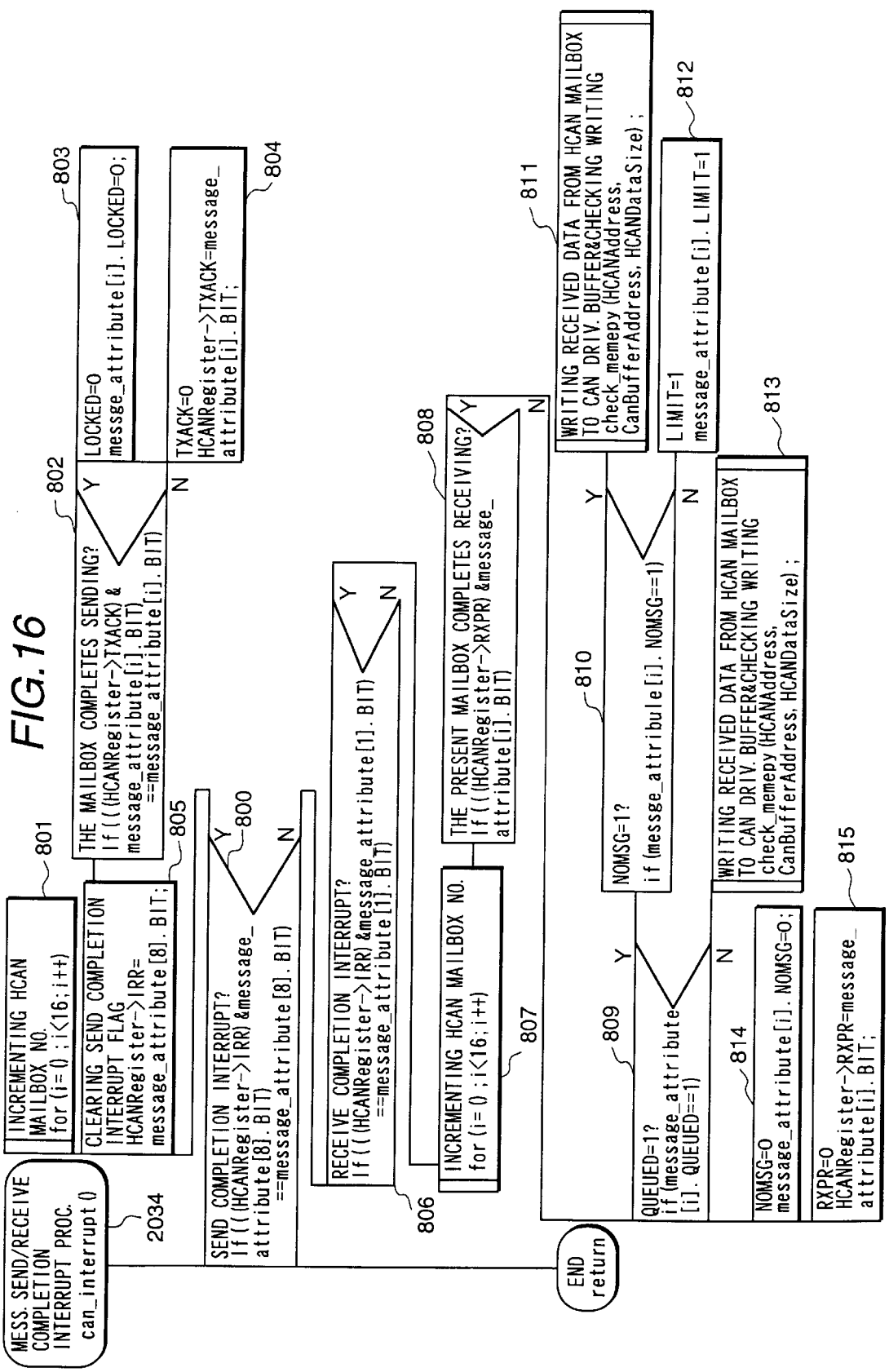
FIG. 16 is a flow chart showing the flow of the message send/receive completion interrupt processing 2034 of the embodiment of the CAN driver in accordance with the present invention.

The message sending and receiving completion interrupt processing 2034 of the CAN driver will be described below in detail. FIG. 16 is a flow chart showing the flow of the message send/receive completion interrupt processing 2034. The message sending and receiving completion interrupt processing of the CAN driver will be described, referring to FIG. 16.

Initially, in Step 800, it is judged whether or not the CAN controller 2003 is set to message sending completion interrupt.

If in message sending completion interrupt, while the condition of Step 801 holds, that is, until number of repetitions becomes equal to number of the mailboxes of the CAN controller 2003, the procedure from Step 802 to Step 804 is repetitively executed in the ascending numeric order of the mailbox number.

In Step 802, it is judged whether or not a bit is set to TXACK 5003.

If a bit is set, in Step 803 the LOCKED 4005 is cleared.

Next, in Step 804, the TXACK 5003 is cleared.

In Step 805, the message sending completion interrupt flag is cleared.

In Step 806, it is judged whether or not the CAN controller 2003 is set to message receiving completion interrupt.

If in message receiving completion interrupt, while the condition of Step 807 holds, that is, until number of repetitions becomes equal to number of the mailboxes of the CAN controller 2003, the procedure from Step 808 to Step 815 is repetitively executed in the ascending numeric order of the mailbox number.

In Step 808, it is judged whether or not a bit is set to RXPR 5004.

If a bit is set, in Step 809 it is judged whether or not a bit is set to the QUEUED 4004.

If a bit is set in the judgment in Step 809, in Step 810 it is judged whether or not a bit is set to the NOMSG 4006.

If a bit is set in the judgment in Step 810, in Step 811 the received message is written from the mailbox 2023 to the buffer 2031 and it is judged whether or not the received message is correctly written. If the received message is not correctly written, the communication error processing 2073 is started.

If a bit is not set in the judgment in Step 810, in Step 812 a bit is set to the LIMIT 4007.

If a bit is set in the judgment in Step 809, in Step 813 the received message is written from the mailbox 2023 to the buffer 2031 using the highly reliable memory copy processing 2038 and it is judged whether or not the received message is correctly written. If the received message is not correctly written, the communication error processing 2073 is started.

In Step 814, the NOMSG 4006 is cleared.

In Step 815, the PXPR 5004 is cleared.

Figure 18:
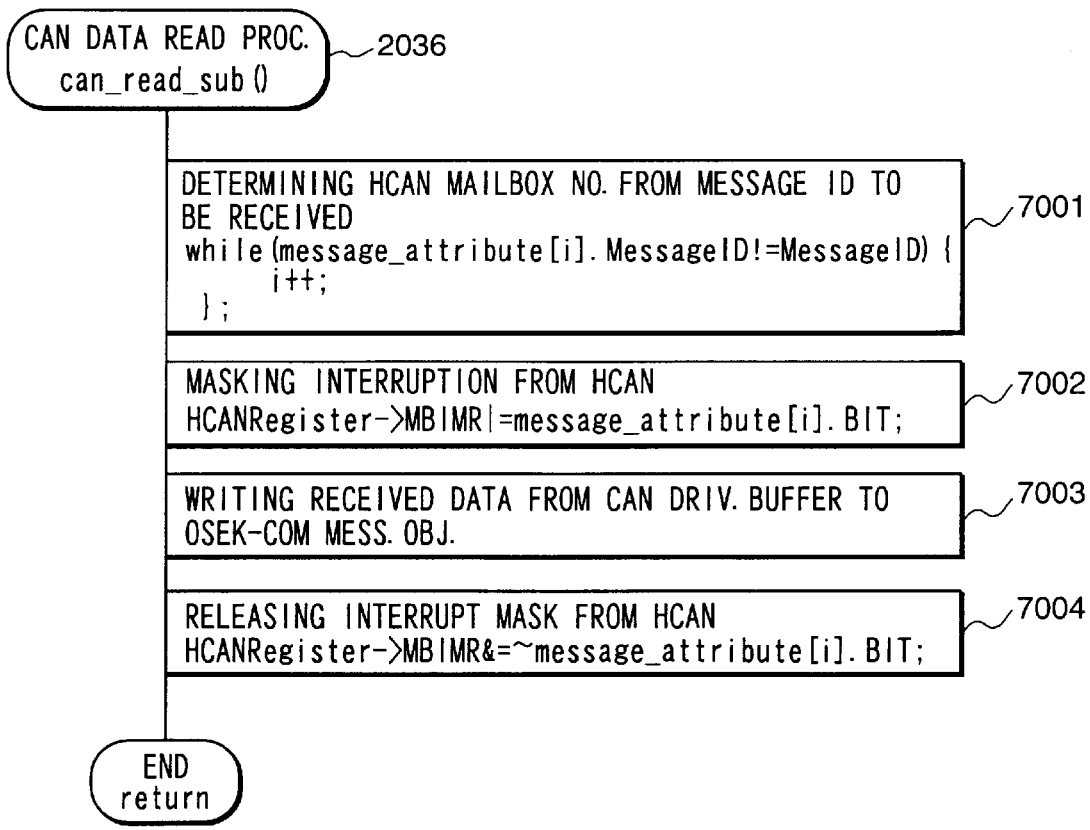
FIG. 18 is a flow chart showing the flow of the CAN data read processing 2036 of the embodiment of the CAN driver in accordance with the present invention.

The CAN data read processing 2036 will be described below in detail. FIG. 18 is a flow chart showing the flow of the CAN data read processing 2036. The CAN data read processing will be described, referring to FIG. 18. As an example, it is assumed that the received message uses the buffer a 2018.

Initially, in Step 7001, a mailbox number is determined from the message ID of the received message using the message attribute table 2021.

In Step 7002, a bit is set to MBIMR 5005.

In Step 7003, data of the message to be received is written from the buffer a 2018 to a received data storing area. An address of the received data storing area is passed as an argument when the CAN data read processing 2036 is called.

In Step 7004, the MBIMR 5005 is cleared.

Figure 19:
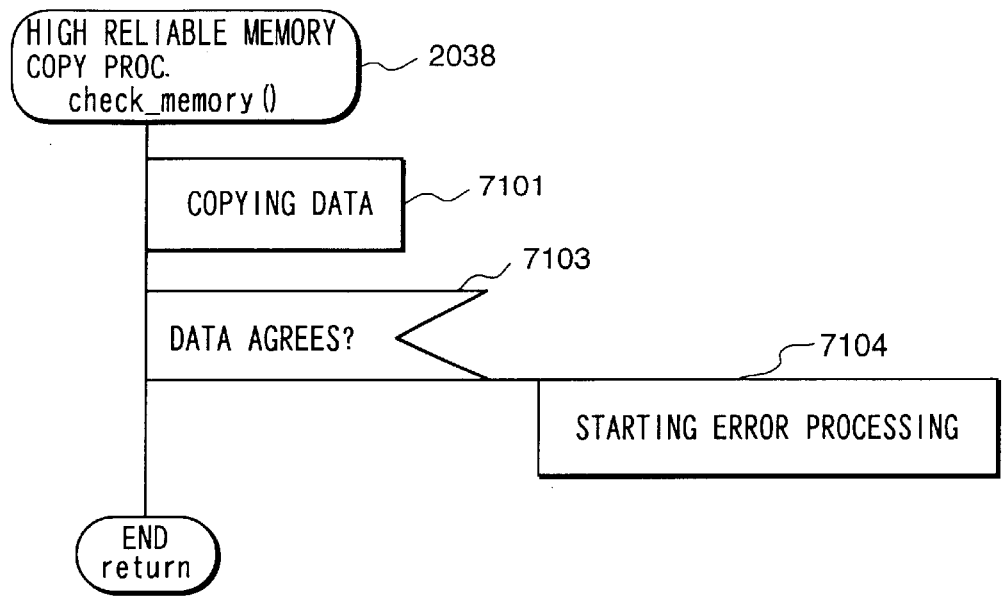
FIG. 19 is a flow chart showing the flow of the highly reliable memory copy processing 2038 of the embodiment of the CAN driver in accordance with the present invention.

The highly reliable memory copy processing 2038 will be described below in detail. FIG. 19 is a flow chart showing the flow of the highly reliable memory copy processing 2038. The highly reliable memory copy processing will be described, referring to FIG. 19.

Initially, in Step 7101, data in a write source is copied to a data storing area in a write target.

In Step 7103, it is judged by comparison whether or not the data in the write source agrees with the data in the write target.

If does not agree, in Step 7104 the communication error processing 2073 is started.

Figure 20:
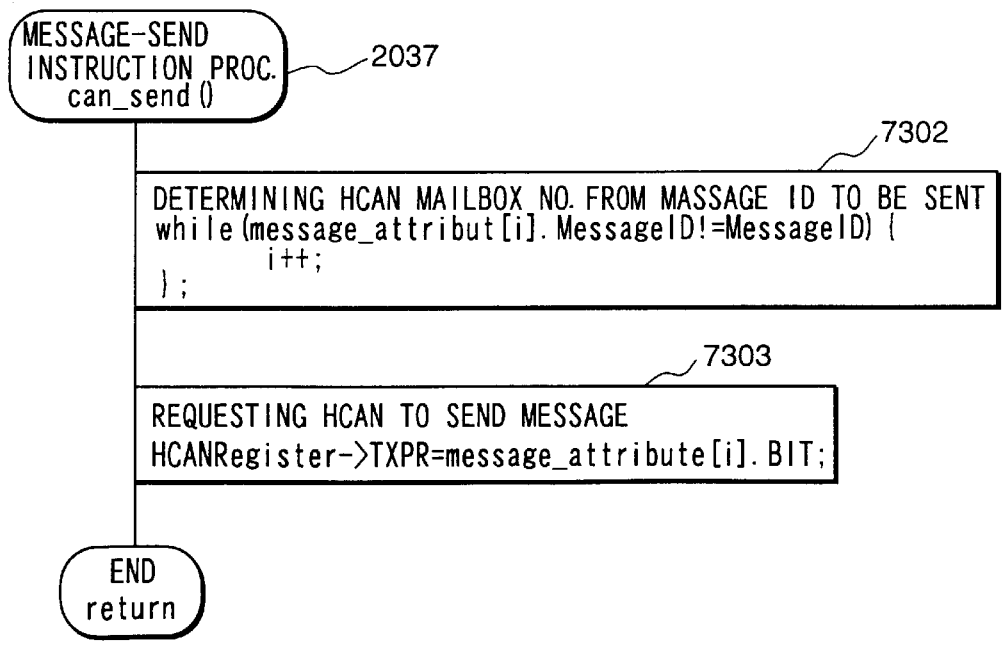
FIG. 20 is a flow chart showing the flow of the message-send instruction processing 2037 of the embodiment of the CAN driver in accordance with the present invention.

The message-send instruction processing 2037 will be described below in detail. FIG. 20 is a flow chart showing the flow of the message-send instruction processing 2037. The message-send instruction processing will be described, referring to FIG. 20.

In Step 7302, a mailbox number is determined from the message ID of the message to be sent using the message attribute table 2021.

In Step 7303, a bit is set to the TXPR 5002 to request the CAN controller 2003 to perform message sending to the network 2005.

Figure 21:
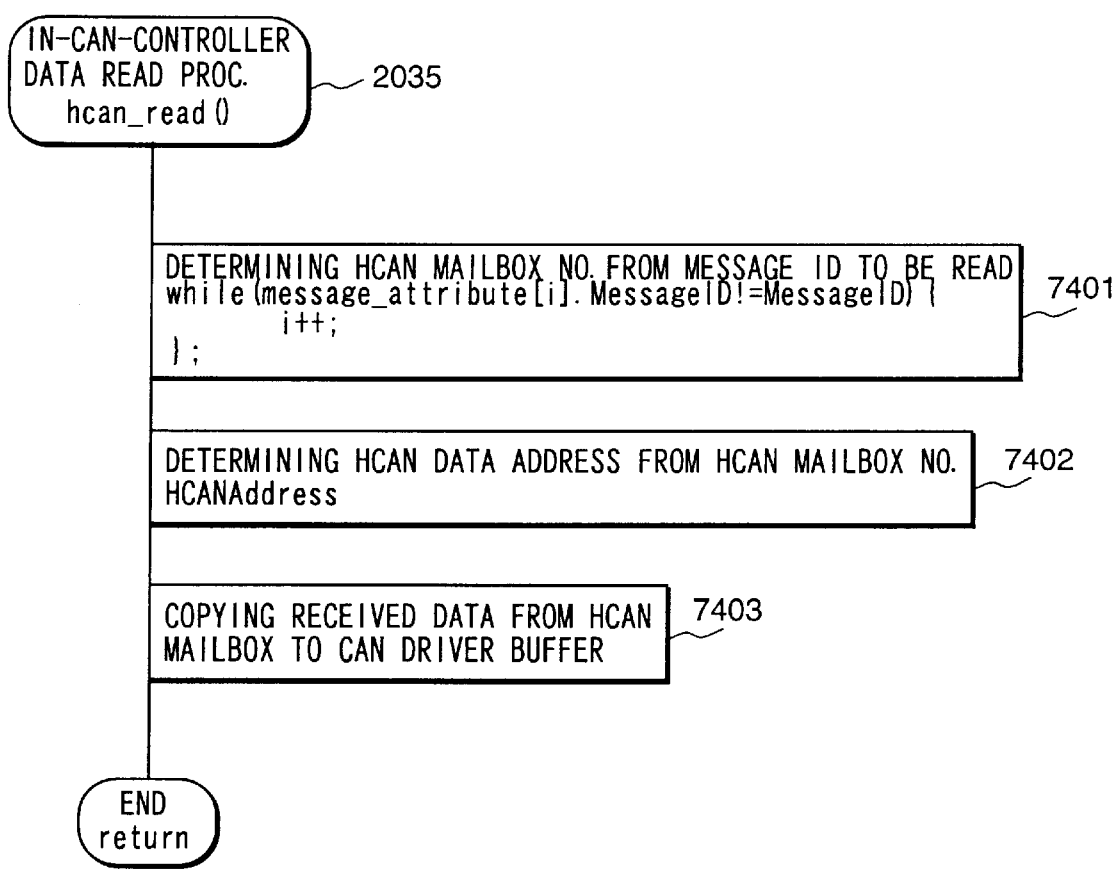
FIG. 21 is a flow chart showing the flow of the in-CAN-controller data read processing 2035 of the embodiment of the CAN driver in accordance with the present invention.

The in-CAN-controller data read processing 2035 will be described below in detail. FIG. 21 is a flow chart showing the flow of the in-CAN-controller data read processing 2035. The in-CAN-controller data read processing will be described, referring to FIG. 21.

In Step 7401, a mailbox number is determined from the message ID of the message to be sent using the message attribute table 2021.

In Step 7402, an address of the send/receive mailbox 2023 of the CAN controller is specified from the mailbox number obtained in Step 7401.

In Step 7403, message data stored in the address of the send/receive mailbox 2023 specified in Step 7402 is copied to a write target data. An address of the write target data is passed as an argument when the in-CAN-controller data read processing is called.

(e) CAN Controller

The CAN controller will be described below. A communication protocol used by the CAN controller is a CAN protocol. In the CAN protocol, each message has a specific message ID. Priority is assigned to the message ID, and priority control (bus-arbitration) of the network 2005 is performed based on the priority of the message ID. The bus-arbitration by the message ID will be described. For example, it is assumed that the control unit 2000 is connected to a plurality of control units having a structure similar to that of the control unit 2000 though the network 2005. In a case where each of the control units sends a message to the network 2005 at the same time, only the single unit sending a message having the highest priority message ID acquires the right to use the network 2005 (wins the bus-arbitration) and can preferentially send the message to the network 2005.

The structure of the CAN controller will be described below in detail. The CAN controller 2003 is composed of the control register 2022, the send/receive mailbox 2023, the priority control part 2024, the send buffer 2025, the receive filter 2027 and the receive buffer 2026. The receive buffer 2026 corresponds to the received message memory means described in Means to solve the Problems. These components will be described below in detail.

Figure 2:
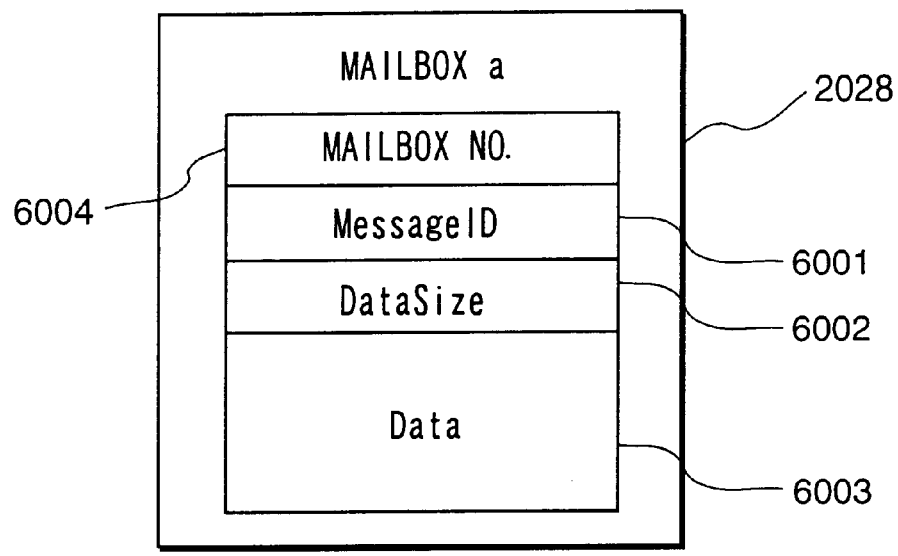
FIG. 2 is a view showing the detailed construction of a mailbox a 2028 composing the CAN controller in the embodiment of the highly reliable distributed system in accordance with the present invention.

The send/receive mailbox 2023 is composed of a plurality of mailboxes such as a mailbox a 2028, a mailbox b 2029, a mailbox c 2030 and so on, and stores sent messages and received messages. FIG. 2 is a view showing the detailed construction of a mailbox a 2028. The mailbox a 2028 is composed of the mailbox number 6004, the MessageID 6001, the DataSize 6002 and the Data 6003. The mailbox number 6004 is an area for storing mailbox numbers specifically given to the individual mailboxes of the send/receive mailbox 2023. The MessageID 6001 is an area for storing message IDs of sent messages and received messages. The mailbox a 2028 stores a sent message and a received message having the MessageID 6001. The DataSize 6002 is an area for storing data sizes of sent messages and received messages. The Data 6003 is a data storing area of sent messages and received messages. The detailed construction of the mailbox b 2029, the mailbox c is the same as that of the mailbox a 2028.

Figure 3:
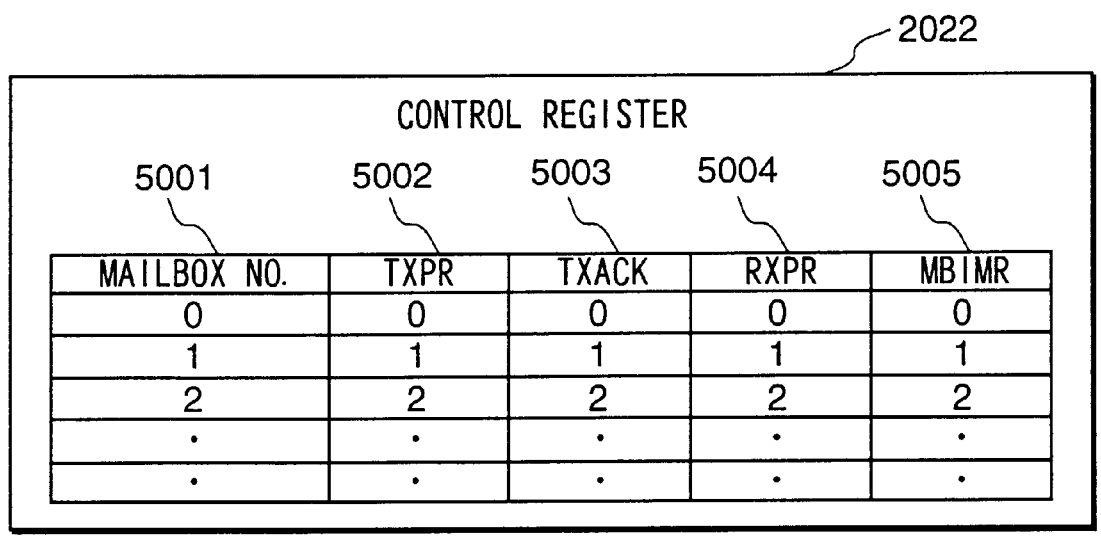
FIG. 3 is a view showing the detailed construction of the control register 2022 of the embodiment of the CAN controller in accordance with the present invention.

FIG. 3 is a view showing the detailed construction of the control register 2022. The control register 2022 is composed of the mailbox number 5001, the TXPR 5002, the TXACK 5003, the RXPR 5004 and the MBIMR 5005. The mailbox number 5001 is an area for storing mailbox number on the mailbox basis. The TXOR 5002 is an area for storing message send request on the mailbox basis, and is bit-set when message sending is requested to the CAN controller 2003. The TXACK 5003 is an are for storing completion of message sending on the mailbox basis, and is bit-set when message sending is completed by the CAN controller 2003. The RXPR 5004 is an are for storing completion of message receiving on the mailbox basis, and is bit-set when message receiving is completed by the CAN controller 2003. The MBIMR 5005 is an area for storing prohibition of interruption at completion of message sending or at completion of message receiving, and is bit-set when interruption from the CAN controller 2003 to the CPU 2001 is prohibited at completion of message sending or at completion of message receiving.

The priority control part 2024 transfers a message of a corresponding mail box to the send buffer 2025 when a message sending request is made. Further, when a plurality of massage sending requests are made at a time, the priority control part 2024 compares message IDs stored in the corresponding mailboxes with one another, and transfers a message of a mailbox storing the highest priority message ID to the send buffer 2025.

The send buffer 2025 stores the message transferred from the priority control part 2024. The stored message participates bus-arbitration by the message ID. If the message wins in the bus-arbitration by the message ID, the message is sent to the network 2005. If the message loses the bus-arbitration by the message ID, the message is not sent to the network 2005 and waits for the next chance of bus-arbitration. When the control unit loses the bus-arbitration by a massage ID and a message sending request is generated to a message having a higher priority message ID, the priority control part 2024 transfers the message of a mailbox storing the higher priority message ID to the send buffer 2025.

The receive buffer 2026 stores a received message from the network 2005.

The receive filter 2027 compares a message ID of a message stored in the receive buffer 2026 with message IDs registered to the mailboxes. If there is the same message ID, the receive filter stores the message in the corresponding mailbox.

Description will be made below in detail on the application program 2006, the OSEK-COM 2008, the CAN driver 2009, the highly reliable communication software 2080 and the OS 2050 which are stored in the memory 2002.

(f) Application Program

The application program will be described. The application program 2006 is composed of a plurality of programs such as AP a 2012, AP b 2013, AP c 2014 and so on, as shown in FIG. 1. In this embodiment, each of these application programs is executed as a different task.

(g) OS

The OS 2050 will be described below in detail. The OS 2050 comprises a task priority management table 2051, a scheduler 2052 for executing scheduling of a task, and tasks to be started. A scheduling method of the scheduler 2052 using the task priority management table 2051 will be described.

Figure 17:
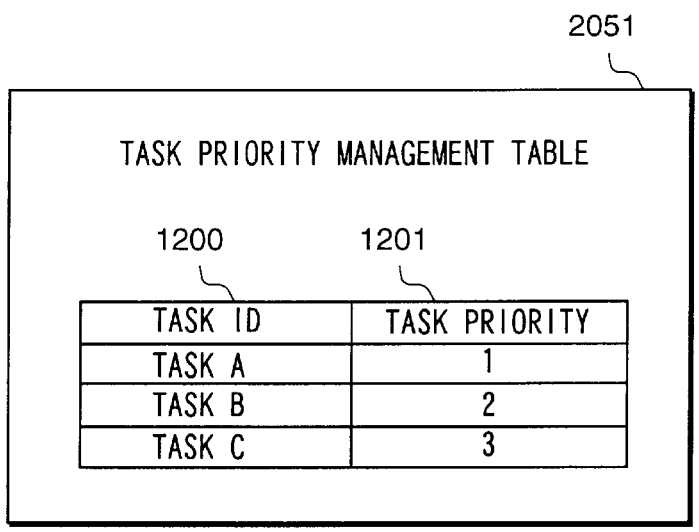
FIG. 17 is a view showing the detailed construction of the task priority management table 2051 composing the OS in the control unit of the embodiment of the highly reliable distributed system in accordance with the present invention.

FIG. 17 is a view showing the construction of the task priority management table. The construction of the task priority management table will be-described, referring to FIG. 17. The construction of the task priority management table is composed of task IDs 1200 and task priorities 1201. Assuming that the priorities of the task IDs are task A, task B, task C in the descending order, the task priority management table is preset so that the task priorities of the tasks to be started are also set to 1, 2, 3 in the descending order corresponding to the priorities of the task ID. The scheduler 2052 preferentially starts the higher priority task referring to the task priority management table 2051.

According to the embodiment in accordance with the present invention, when data in the application program is sent, the data in the application program is sum-processed, the sum-processed data is written in the mailbox, the data written in the mailbox is reconverted to the original data by checksum processing to check that no abnormality is detected. Thereby, it is possible to ensure the data is written in the mailbox without damaging the sum processing and the content of the sum-processed data. Further, by checking that the data after checksum processing agrees with the data to be sent in the application program, it can be ensured that the data sum-processed and written in the mailbox is the data to be sent in the application program. Therefore, it can be ensured that the sent data is normally sum-processed and the content of the data after sum-processing is written in the mailbox without being damaged.

When data is received, arrived data in the mailbox is successively written in the CAN driver, in the message object of the OSEK-COM and in the highly reliable communication software, and it is checked every writing that the arrived data agreeing with the data in the write source agrees with the data written in the CAN driver. Thereby, it can be ensured that the content of the arrived data in the mailbox is written in the highly reliable software without being damaged. By checksum processing the arrived data in the highly reliable software and by checking that no abnormality is detected, it can be ensured that the content of the data written to the mailbox is not damaged. By writing the checksum-processed data in the application program, and further sum processing the written data, and then checking that the data after sum processing agrees with the data delivered in the highly reliable communication software from the mailbox, it can be ensured that the checksum processing is normally processed and that the content of the data is written in the application program without being damaged. According to the present invention, it can be ensured that the data content of the application program of the sending source can be delivered to the application program of the receiving target without being damaged.

Further, according to the present invention, none of the sum processing, the checksum processing, the highly reliable communication software, the OSEK-COM and the CAN driver does not require plural versions, and accordingly the developing period can be shortened.

In addition, according to the present invention, sending processing time is the sum of sum processing time, checksum processing time, sending processing time after the OSEK-COM and simple receiving processing time after the OSEK-COM. If the simple processing time of the sum processing, the checksum processing and the receiving processing after the OSEK-COM is sufficiently small compared to the sending processing time after the OSEK-COM, the sending processing time of the present invention becomes the sending processing time after the OSEK-COM. On the other hand, sending processing time of the prior art is the sum of individual time periods executing a plurality of versions of sending processing after the OSEK-COM. Therefore, the sending processing time of the present invention can be made short compared to the sending processing time of the prior art.

Furthermore, according to the present invention, receiving processing time is the sum of receiving processing time after the OSEK-COM, checksum processing time and sum processing time. If the processing time of the sum processing and the checksum processing is sufficiently small compared to the receiving processing time after the OSEK-COM, the receiving processing time of the present invention becomes the receiving processing time after the OSEK-COM. On the other hand, receiving processing time of the prior art is the sum of individual time periods executing a plurality of versions of receiving processing after the OSEK-COM. Therefore, the receiving processing time of the present invention can be made short compared to the receiving processing time of the prior art.

Embodiment 2

In the embodiment 1 of the present invention, in sending processing, the sum-processed data is written in the mailbox by the sending protocol processing of the OSEK-COM, the data in the mailbox is processed with the receiving protocol processing of the OSEK-COM and further processed with the checksum processing, and then a sending command is output after checking that the content of the data written in the mailbox is not damaged and further after checking by comparison that the data after checksum processing agrees with the sent data in the application program. However, the sending command may be output to send the sent data to the network just after writing it in the mailbox by the sending protocol processing of the OSEK-COM. By doing so, the sending processing time can be shortened because the time executing the sending protocol processing of the OSEK-COM and further the checksum processing of the data written in the mailbox can be reduced. The content of data written in the mailbox can be detected by executing the checksum processing even if it is damaged. Further, the highly reliable communication software needs not to use the sending command processing of the CAN driver, but uses only the sending and receiving protocol processing of the OSEK-COM. Furthermore, the CAN driver can be omit the processing to judge whether or not the sending command is output just after writing the data in the mailbox.

Embodiment 3

In the embodiment 2 in accordance with the present invention, the sent data in the application program is sum-processed, and the sending command is output to send the data to the network just after writing the data in the mailbox by the sending protocol processing of the OSEK-COM. However, it is possible that after that the data written in the mailbox is executed with the receive protocol processing of the OSEK-COM, and further executed with the checksum processing, and then it is checked that the data after being checksum-processed agrees with the sent data in the application program. By doing so, although it is after sending, it can be ensured that the content of the data is not damaged.

Embodiment 4

In the embodiment 1 of the present invention, in the receiving processing of the highly reliable communication software, the received data in the highly reliable communication software is checksum-processed, the checksum-processed data is written in the application program, then the data written in the application program is sum-processed, and it is checked that the sum-processed data agrees with the received data in the highly reliable communication software. However, it is possible that the received data which has been sum-processed is checksum-processed and temporarily stored in the highly reliable communication software, the stored checksum-processed data is again sum-processed, the sum-processed data is compared with the received data which has been sum-processed, and if both the sum-processed data agree with each other, the received and checksum-processed data stored in the highly reliable communication software is written in the application program. Also, it is possible that after the received data which has been sum-processed is checksum-processed and written in the application program, the checksum-processed data is further temporarily stored in the highly reliable communication software, and the agreement between the checksum-processed data stored in the highly reliable communication software and the date written in the application program is confirmed. By doing so, after checking that the content of the data after being checksum-processed is correct, the data can be written in the application program.

Embodiment 5

In the embodiment 1 of the present invention, the received data in the highly reliable communication software is checksum-processed, the checksum-processed received data is written in the application program, the received data written in the application program is sum-processed, and then it is checked that the received data sum-processed agrees with the received data in the highly reliable communication software. However, it may be checked that the received data sum-processed agrees with the received data in the message object of the OSEK-COM. By doing so, in the receive protocol processing of the OSEK-COM, there is an effect to reduce the checking processing that the received data written from the message object of the OSEK-COM to the highly reliable communication software agrees with the received data of the message object in the write source. Further, instead of checking that the sum-processed received data agrees with the received data in the highly reliable communication software, it may be checked by comparison that the sum-processed received data agrees with the received data of the buffer in the CAN driver. By doing so, it is possible to reduce the processing in the CAN driver for checking that the received data to be written from the buffer in the CAN driver to the message object of the OSEK-COM agrees with the received data in the CAN driver of write source, and the processing in the receiving protocol processing of the OSEK-COM for checking that the received data to be written from the message object of the OSEK-COM to the highly reliable communication software agrees with the received data of the message object of write source. Further, instead of checking that the sum-processed received data agrees with the received data in the highly reliable communication software, it is possible to check that the sum-processed received data agrees with the received data in the mailbox. By doing so, it is possible to reduce the processing in the CAN driver for checking that the received data to be written from the mailbox to the buffer in the CAN driver agrees with the received data in the mailbox of write source, and the processing for checking that the received data to be written from the buffer in the CAN driver to the message object of the OSEK-COM agrees with the received data in the CAN driver of write source, and the processing in the receiving protocol processing of the OSEK-COM for checking that the received data to be written from the message object of the OSEK-COM to the highly reliable communication software agrees with the received data of the message object of write source.

Embodiment 6

In the embodiment of the present invention, in a case of data sending, the sent data in the application program is sum-processed by the highly reliable communication software, the data sum-processed by the send protocol processing of the OSEK-COM is written in the CAN controller, the data written in the CAN controller is received by the receive protocol processing of the OSEK-COM, and the received data stored in a message object of the OSEK-COM is checksum-processed to compare with the sent data in the application program. However, it is possible that the sent data in the application program is written in the CAN controller by the sending processing of the OSEK-COM without executing the sum processing, the data written to the CAN controller is received by the receive processing of the OSEK-COM, and the received data is compared with the sent data in the application program. In this case, there is an effect that the processing time can be shortened by the time periods of the sum processing and the checksum processing and the memory area for storing the contents of the sum processing and the checksum processing can be reduced. In the case of eliminating the sum processing and the checksum processing, in receiving a message, the data extracted from the received message delivered to the CAN network is written in the application program, by the receive protocol processing of the OSEK-COM, the extracted data written in the application program is re-composed to a message without being sum-processed by the send protocol processing, and the re-composed message is compared with the received message delivered to the CAN network. By doing so, the receiving processing time can be shortened.

According to the embodiment in accordance with the present invention, when data in the application program is sent, the data in the application program is sum-processed, the sum-processed data is written in the mailbox, the data written in the mailbox is reconverted to the original data by checksum processing to check that no abnormality is detected. Thereby, it is possible to ensure the data is written in the mailbox without damaging the sum processing and the content of the sum-processed data. Further, by checking that the data after checksum processing agrees with the data to be sent in the application program, it can be ensured that the data sum-processed and written in the mailbox is the data to be sent in the application program. Therefore, it can be ensured that the sent data is normally sum-processed and the content of the data after sum-processing is written in the mailbox without being damaged.

When data is received, arrived data in the mailbox is successively written in the CAN driver, in the message object of the OSEK-COM and in the highly reliable communication software, and it is checked every writing that the arrived data agreeing with the data in the write source agrees with the data written in the CAN driver. Thereby, it can be ensured that the content of the arrived data in the mailbox is written in the highly reliable software without being damaged. By checksum processing the arrived data in the highly reliable software and by checking that no abnormality is detected, it can be ensured that the content of the data written to the mailbox is not damaged. By writing the checksum-processed data in the application program, and further sum processing the written data, and then checking that the data after sum processing agrees with the data delivered in the highly reliable communication software from the mailbox, it can be ensured that the checksum processing is normally processed and that the content of the data is written in the application program without being damaged. According to the present invention, it can be ensured that the data content of the application program of the sending source can be delivered to the application program of the receiving target without being damaged.

Further, according to the present invention, none of the sum processing, the checksum processing, the highly reliable communication software, the OSEK-COM and the CAN driver does not require plural versions, and accordingly the developing period can be shortened.

In addition, according to the present invention, sending processing time is the sum of sum processing time, checksum processing time, sending processing time after the OSEK-COM and simple receiving processing time after the OSEK-COM. If the simple processing time of the sum processing, the checksum processing and the receiving processing after the OSEK-COM is sufficiently small compared to the sending processing time after the OSEK-COM, the sending processing time of the present invention becomes the sending processing time after the OSEK-COM. On the other hand, sending processing time of the prior art is the sum of individual time periods executing a plurality of versions of sending processing after the OSEK-COM. Therefore, the sending processing time of the present invention can be made short compared to the sending processing time of the prior art.

Furthermore, according to the present invention, receiving processing time is the sum of receiving processing time after the OSEK-COM, checksum processing time and sum processing time. If the processing time of the sum processing and the checksum processing is sufficiently small compared to the receiving processing time after the OSEK-COM, the receiving processing time of the present invention becomes the receiving processing time after the OSEK-COM. On the other hand, receiving processing time of the prior art is the sum of individual time periods executing a plurality of versions of receiving processing after the OSEK-COM. Therefore, the receiving processing time of the present invention can be made short compared to the receiving processing time of the prior art.

In the above-mentioned embodiment of the present invention, in sending processing, the sum-processed data is written in the mailbox by the sending protocol processing of the OSEK-COM, the data in the mailbox is processed with the receiving protocol processing of the OSEK-COM and further processed with the checksum processing, and then a sending command is output after checking that the content of the data written in the mailbox is not damaged and further after checking by comparison that the data after checksum processing agrees with the sent data in the application program. On the other hand, in another embodiment (1) in accordance with the present invention, the sending command is output to send the sent data to the network just after writing it in the mailbox by the sending protocol processing of the OSEK-COM. By doing so, the sending processing time can be shortened because the time executing the sending protocol processing of the OSEK-COM and further the checksum processing of the data written in the mailbox can be reduced. The content of data written in the mailbox can be detected by executing the checksum processing even if it is damaged. Further, the highly reliable communication software needs not to use the sending command processing of the CAN driver, but uses only the sending and receiving protocol processing of the OSEK-COM. Furthermore, the CAN driver can be omit the processing to judge whether or not the sending command is output just after writing the data in the mailbox.

In the other embodiment (1) in accordance with the present invention, the sent data in the application program is sum-processed, and the sending command is output to send the data to the network just after writing the data in the mailbox by the sending protocol processing of the OSEK-COM. On the other hand, in the other embodiment (2), after that, the data written in the mailbox is executed with the receive protocol processing of the OSEK-COM, and further executed with the checksum processing, and then it is checked that the data after being checksum-processed agrees with the sent data in the application program. By doing so, although it is after sending, it can be ensured that the content of the data is not damaged.

In the embodiment of the present invention, in the receiving processing of the highly reliable communication software, the received data in the highly reliable communication software is checksum-processed, the checksum-processed data is written in the application program, then the data written in the application program is sum-processed, and it is checked that the sum-processed data agrees with the received data in the highly reliable communication software. On the other hand, in the other embodiment (3), the data written in the application program is sum-processed, after that the checksum-processed data is temporarily stored in the highly reliable communication software, the data is sum-processed, the checksum-processed data temporarily stored in the highly reliable communication software is written in the application program after checking that the sum-processed data agrees with the received data in the highly reliable communication software, and then it is checked that the data temporarily stored in the highly reliable communication software agrees with the data written in the application program. By doing so, after checking that the content of the data after-being checksum-processed is correct, the data can be written in the application program.

In the embodiment of the present invention, the received data in the highly reliable communication software is checksum-processed, the checksum-processed received data is written in the application program, the received data written in the application program is sum-processed, and then it is checked that the received data sum-processed agrees with the received data in the highly reliable communication software. On the other hand, in the other embodiment (4), it is checked that the received data sum-processed agrees with the received data in the message object of the OSEK-COM. By doing so, in the receive protocol processing of the OSEK-COM, there is an effect to reduce the checking processing that the received data written from the message object of the OSEK-COM to the highly reliable communication software agrees with the received data of the message object in the write source. Further, instead of checking that the sum-processed received data agrees with the received data in the highly reliable communication software, it is checked by comparison that the sum-processed received data agrees with the received data of the buffer in the CAN driver. By doing so, it is possible to reduce the processing in the CAN driver for checking that the received data to be written from the buffer in the CAN driver to the message object of the OSEK-COM agrees with the received data in the CAN driver of write source, and the processing in the receiving protocol processing of the OSEK-COM for checking that the received data to be written from the message object of the OSEK-COM to the highly reliable communication software agrees with the received data of the message object of write source. Further, instead of checking that the sum-processed received data agrees with the received data in the highly reliable communication software, it is checked that the sum-processed received data agrees with the received data in the mailbox. By doing so, it is possible to reduce the processing for checking that in the CAN driver, the received data to be written from the mailbox to the buffer in the CAN driver agrees with the received data in the mailbox of write source, and the processing for checking that the received data to be written from the buffer in the CAN driver to the message object of the OSEK-COM agrees with the received data in the CAN driver of write source, and the processing in the receiving protocol processing of the OSEK-COM for checking that the received data to be written from the message object of the OSEK-COM to the highly reliable communication software agrees with the received data of the message object of write source.

In the embodiment of the present invention, in a case of data sending, the sent data in the application program is sum-processed by the highly reliable communication software, the data sum-processed by the send protocol processing of the OSEK-COM is written in the CAN controller, the data written in the CAN controller is received by the receive protocol processing of the OSEK-COM, and the received data is checksum-processed to compare with the sent data in the application program. On the other hand, in the other embodiment (5), the sent data in the application program is written in the CAN controller by the sending processing of the OSEK-COM without executing the sum processing, the data written to the CAN controller is received by the receive processing of the OSEK-COM, and the received data is compared with the seat data in the application program. In this case, there is an effect that the processing time can be shortened by the time periods of the sum processing and the checksum processing and the memory area for storing the contents of the sum processing and the checksum processing can be reduced. In the case of eliminating the sum processing and the checksum processing, in receiving data, the data delivered to the CAN network is written in the application program by the receive protocol processing of the OSEK-COM, the received data written in the application program is executed with the send protocol processing without being sum-processed, and the obtained data is compared with the data delivered to the CAN network. By doing so, the receiving processing time can be shortened.

What is claimed is:

1. A highly reliable distributed system including a memory for storing an application program, a CPU for executing said application program, and a network controller connected to a network for sending a message that is to be sent onto the network while said CPU is executing said application program stored in said memory, said highly reliable distributed system comprising:

send data memory means for storing data generated by said application program, which data are to be sent;

send protocol processing means for receiving data to be sent that are stored in said send data memory means, and for executing a predetermined send protocol processing to compose a message to be sent and to be transferred to said network controller, using said data to be sent;

receive protocol processing means for receiving the composed message to be sent generated by said send protocol processing means prior to sending the same, and subjecting the same to a predetermined receive protocol processing as if the same were actually received, to extract a data part from said composed message to be sent; and send data comparing means for comparing said data to be sent stored in said send data memory means with said data part extracted from said composed message to be sent by said receive protocol processing means.

2. A highly reliable distributed system according to claim 1, wherein said network controller is requested to send said message to be sent, composed by said send protocol processing means, only when a result of said comparing executed by said send data comparing means indicates agreement.

3. A highly reliable distributed system according to claim 1, wherein said network controller is requested to send said message to be sent, just after said message to be sent is composed by said send protocol processing means.

4. A highly reliable distributed system according to claim 1, wherein said send protocol processing means comprises:
error detection coding means for receiving said data to be sent stored in said send data memory means, executing a predetermined error detection coding processing, and generating error-detection-coded data to be sent; and error-detection-coded data send protocol processing means for receiving said error-detection-coded data to be sent generated by said error detection coding means, executing the predetermined send protocol processing, and composing the message to be sent and to be transferred to said network controller;

wherein said receive protocol processing means comprises:
  error-detection coding receive protocol means for receiving said message to be sent generated by said send protocol processing means, executing the predetermined receive protocol processing, and extracting an error-detection-coded data part to be sent from said error-detection-coded message to be sent; and
  error detection decoding processing means for receiving said error-detection-coded data to be sent part extracted by said error detection coding receive protocol processing means, executing a predetermined error detection decoding processing to extract the data part to be sent from said error-detection-coded message to be sent, and checking for whether an error exists in said error-detection-coded data part to be sent extracted from said error-detection-coded message to be sent.

5. A highly reliable distributed system according to claim 1,
  wherein said send protocol processing means comprises:
    error detection coding means for receiving said data to be sent stored in said send data memory means, executing a predetermined error detection coding processing, and generating error detection-coded data to be sent, using said data to be sent; and
    error detection coding data send protocol processing means for receiving said error-detection-coded data to be sent generated by said error detection coding means, executing the predetermined send protocol processing, composing the message to be sent and to be transferred to said network controller, using said error-detection-coded data to be sent, and requesting said network controller to send said message to be sent;
  wherein said receive protocol processing means comprises:
    error detection coding receive protocol means for receiving said message to be sent composed by said send protocol processing means, executing the predetermined receive protocol processing, and extracting an error-detection-coded data part to be sent from said error-detection-coded message to be sent; and
    error detection decoding processing means for receiving said error-detection-coded data part to be sent extracted by said error detection coding receive protocol processing means, executing a predetermined error detection decoding processing, extracting the data part to be sent from said error-detection-coded message to be sent, and checking for whether an error exists in said error-detection-coded data part to be sent in said error-detection-coded message to be sent.

6. A highly reliable distributed system according to claim 1, wherein said high reliability distributed system is a vehicle control system.

7. A highly reliable distributed system including a memory for storing an application program, a CPU for executing said application program stored in said memory, and a network controller connected to a network, for receiving a receive message transmitted on said network, while said CPU is executing said application program stored in said memory, said highly reliable distributed system comprising:
  receive message memory means for storing a received message transmitted on said network;
  receive protocol processing means for receiving said receive message stored in said receive message memory means, and executing a predetermined receive protocol processing to extract a data part, which is to be written in said application program, from said received message;
  send protocol processing means for receiving said data part extracted from said received message by said receive protocol processing means prior to writing the same in the application program, and for subjecting the same to a predetermined send protocol processing as if the same were actually to be sent to recompose a received message; and
  receive message comparing means for comparing said received message stored in said received message memory means with said received message recomposed by said send protocol processing means.

8. A highly reliable distributed system according to claim 7, wherein said data part extracted from said receive message stored in said received message memory means is written in said application program only when a result of said comparing executed by said receive message comparing means indicates agreement.

9. A highly reliable distributed system according to claim 7, wherein said data part extracted from said received message stored in said receive message memory means is written in said application program just after said data part is extracted by said receive protocol processing means.

10. A highly reliable distributed system according to claim 7, wherein said send protocol processing means executes the predetermined send protocol processing to compose the message to be sent, using the data to be sent generated by said application program, which is to be transmitted onto said network, and said receive protocol processing means executes the predetermined receive protocol processing means to extracted the data part from said message to be sent composed by said send protocol processing means, using said data to be sent which is generated by said application program, said distributed system further including send data comparing means for comparing said data to be sent stored in said send data memory means with said data part which is extracted by said receive protocol processing means from said message to be sent composed by said send protocol processing means.

11. A highly reliable distributed system according to claim 10, wherein said network controller is requested to send said message to be sent composed by said send protocol processing means only when a result of said comparing executed by said send data comparing means indicates agreement, and said data part extracted from said received message stored in said receive message memory means is written in said application program only when a result of said comparing executed by said receive message comparing means indicates agreement.

12. A highly reliable distributed system according to claim 10, wherein said network controller is requested to send said message to be sent just after said message to be sent is composed by said send protocol processing means, and said data part extracted from said received message stored in said receive message memory means is written in said application program only when a result of said comparing executed by said receive message comparing means indicates agreement.

13. A highly reliable distributed system according to claim 10, wherein said network controller is requested to send said message to be sent composed by said send protocol processing means only when a result of said comparing executed by said send data comparing means indicates agreement, and said data part extracted from said received message stored in said receive message memory means is written in said application program just after the extraction thereof.

14. A highly reliable distributed system according to claim 10, wherein said network controller is requested to send said message to be sent just after said message to be sent is composed by said send protocol processing means, and said data part extracted from said received message stored in said receive message memory means is written in said application program just after the extraction thereof.

15. A highly reliable distributed system according to claim 7, wherein said receive protocol processing means comprises:

error detection coding receive protocol processing means for receiving said received message stored in said receive message memory means, executing the predetermined receive protocol processing, and extracting an error-detection-coded received data part from said received message; and error detection decoding processing means for receiving said error-detection-coded received data part extracted by said error-detection-coding receive protocol processing means, executing a predetermined error detection decoding processing, extracting a received data part from said error-detection-coded received data part, which is transferred to said application program, and checking for whether an error exists in said error-detection-coded received data part;

wherein said send protocol processing means comprises:

error detection coding means for receiving said received data part extracted by said receive protocol processing means, executing a predetermined error detection coding processing, and generating error-detection-coded received data; and error detection coding data send protocol processing means for receiving said error-detection-coded received data generated by said error detection coding means, executing the predetermined send protocol processing, and recomposing a received message.

16. A highly reliable distributed system according to claim 7, wherein said receive protocol comprises:

error detection coding receive protocol processing means for receiving said received message stored in said receive message memory means, executing a predetermined receive protocol processing, and extracting error-detection-coded received data part from said received message; and error detection decoding processing means for receiving said error-detection-coded received data part extracted by said error-detection-coding receive protocol processing means, executing a predetermined error detection decoding processing, extracting a received data part to be transferred to said application program, checking for whether an error exists in said error-detection-coded received data part, and transferring said received data part to said application program only when it is not detected that the error exists in said error detection-coded received data part; and wherein said send protocol processing means comprises:

error detection coding means for receiving said received data part extracted by said receive protocol processing means, executing a predetermined error detection coding processing, and generating error-detection-coded received data; and error detection coding data send protocol processing means for receiving said error-detection-coded received data generated by said error detection coding means, executing the predetermined send protocol processing, and recomposing a received message.

17. A high reliability distributed system according to claim 7, wherein said high reliability distributed system is a vehicle control system.

* * * * *